US012569820B2

(12) United States Patent
Lintner et al.

(10) Patent No.: US 12,569,820 B2
(45) Date of Patent: Mar. 10, 2026

(54) UNIVERSAL FUNCTIONALIZED BEADS AND METHOD OF MAKING SAME

(71) Applicant: RAN Biotechnologies, Inc., Beverly, MA (US)

(72) Inventors: Robert E. Lintner, Amesbury, MA (US); Roger A. Nassar, Marblehead, MA (US)

(73) Assignee: RAN Biotechnologies, Inc., Beverly, MA (US)

( * ) Notice: Subject to any disclaimer, the term of this patent is extended or adjusted under 35 U.S.C. 154(b) by 585 days.

(21) Appl. No.: 17/786,441

(22) PCT Filed: Dec. 18, 2020

(86) PCT No.: PCT/US2020/066245
§ 371 (c)(1),
(2) Date: Jun. 16, 2022

(87) PCT Pub. No.: WO2021/127588
PCT Pub. Date: Jun. 24, 2021

(65) Prior Publication Data
US 2023/0356168 A1 Nov. 9, 2023

Related U.S. Application Data

(60) Provisional application No. 62/951,722, filed on Dec. 20, 2019.

(51) Int. Cl.
*B01J 13/14* (2006.01)
*B01J 13/00* (2006.01)
(Continued)

(52) U.S. Cl.
CPC ........... *B01J 13/0052* (2013.01); *B01J 13/14* (2013.01); *C08J 3/03* (2013.01); *C08J 3/096* (2013.01);
(Continued)

(58) Field of Classification Search
CPC . B01J 13/0052; B01J 13/14; C08J 3/03; C08J 3/096; C08J 3/241; C08J 2300/106
See application file for complete search history.

(56) References Cited

U.S. PATENT DOCUMENTS

| | | | |
|---|---|---|---|
| 10,105,681 B2 | 10/2018 | Nassar | |
| 10,640,804 B2 | 5/2020 | Nassar | |

(Continued)

FOREIGN PATENT DOCUMENTS

| | | |
|---|---|---|
| WO | WO 03/055597 A1 | 7/2003 |
| WO | WO 2008/109176 A2 | 9/2008 |

(Continued)

OTHER PUBLICATIONS

Yang et al (Journal of Chromatography B, 707 (1998) 131-141) (Year: 1998).*

(Continued)

*Primary Examiner* — Jiangtian Xu
(74) *Attorney, Agent, or Firm* — Wolf, Greenfield & Sacks, P.C.

(57) ABSTRACT

The present invention is generally directed to beads, methods of making said beads, and methods of functionalizing said beads with one or more functional groups to form functionalized beads, such as universal functionalized beads, wherein the functional group can be a chemical group. In some embodiments, the beads can be gel beads.

16 Claims, 15 Drawing Sheets

(51) Int. Cl.
    *C08J 3/03*        (2006.01)
    *C08J 3/09*        (2006.01)
    *C08J 3/24*        (2006.01)

(52) U.S. Cl.
    CPC ......... *C08J 3/241* (2013.01); *C08J 2300/106*
                                  (2013.01)

(56)            References Cited

U.S. PATENT DOCUMENTS

| | | | |
|---|---|---|---|
| 11,123,708 B2 | 9/2021 | Nassar | |
| 2010/0136544 A1* | 6/2010 | Agresti ................. | C12Q 1/686 |
| | | | 435/287.2 |
| 2016/0008788 A1 | 1/2016 | Nassar | |
| 2017/0361324 A1 | 12/2017 | Nassar et al. | |
| 2018/0112036 A1 | 4/2018 | Nassar et al. | |
| 2018/0171373 A1 | 6/2018 | Weitz et al. | |
| 2018/0363029 A1 | 12/2018 | Hindson et al. | |
| 2019/0071667 A1 | 3/2019 | Hinz et al. | |
| 2020/0116699 A1* | 4/2020 | Mena .................. | C12Q 1/6804 |
| 2020/0239929 A1 | 7/2020 | Nassar | |
| 2022/0135962 A1 | 5/2022 | Nassar et al. | |

FOREIGN PATENT DOCUMENTS

| | | |
|---|---|---|
| WO | WO 2012/142132 A1 | 10/2012 |
| WO | WO 2014/145555 A1 | 9/2014 |
| WO | WO 2015/017972 A1 | 2/2015 |

OTHER PUBLICATIONS

Partial Supplementary European Search Report for EP Application No. 20900864.8 dated Jan. 9, 2024.
International Search Report and Written Opinion for International Application No. PCT/US2020/066245 dated Apr. 16, 2021.
International Preliminary Report on Patentability for International Application No. PCT/US2020/066245 dated Jun. 30, 2022.
U.S. Appl. No. 16/846,509, filed Apr. 13, 2020, Nassar.
U.S. Appl. No. 15/567,232, filed Oct. 17, 2017, Nassar.
U.S. Appl. No. 17/435,345, filed Aug. 31, 2021, Nassar et al.
PCT/US2020/066245, Apr. 16, 2021, International Search Report and Written Opinion.
PCT/US2020/066245, Jun. 30, 2022, International Preliminary Report on Patentability.

\* cited by examiner

Step 1: Synthesis of functionalized materials

Monomer     Crosslinker     Functionalized monomer

Step 2: Further functionalization of functionalized materials, where A and B react with each other to form linkage C Mode 1: Linear functionalization Mode 2: Branched functionalization

Post Polymerization Bead Functionalization

Covalent attachment of biomolecules to universal beads via NHS ester and azide.
Universal beads are also compatible with click and copper-free click chemistry.

UNIVERSAL FUNCTIONALIZED BEADS AND METHOD OF MAKING SAME

CROSS-REFERENCE TO RELATED APPLICATIONS

This Application is a national stage filing under 35 U.S.C. § 371 of International Patent Application Serial No. PCT/US2020/066245, filed Dec. 18, 2020, entitled "UNIVERSAL FUNCTIONALIZED BEADS AND METHOD OF MAKING SAME", and claims the benefit under 35 U.S.C. § 119 (e) of U.S. Provisional Application Ser. No. 62/951,722, filed Dec. 20, 2019, entitled "UNIVERSAL FUNCTIONALIZED BEADS AND METHOD OF MAKING SAME". The entire contents of these applications are incorporated herein by reference in their entirety.

FIELD

The teachings herein relate generally to beads and method of making same, and more particularly to universal gel beads functionalized with chemical functionalities and method of making same.

BACKGROUND

The biocompatibility of gel beads in general and polyacrylate beads in particular, coupled with their ability to be porous, soft yet tough, allows them to remain widely used materials in biological applications. In general, functionalization of these beads with biological entities includes the incorporation of these entities in the manufacturing process of these beads. This approach leads to the need for manufacturing a new lot of beads each time a different biological entity is needed in or on these beads.

Accordingly, there is need for improved functionalized beads and thereby improved method of making same.

SUMMARY

The invention discloses beads as well as the gel beads that are made by the inventive processes. The invention further discloses the use of gel beads to capture biologicals, chemicals, any derivations thereof, or any combinations thereof.

In one embodiment, there is a method of making gel beads, the method comprising: suspending a first fluid sample in a second fluid sample to form a plurality of fluidic droplets, wherein the first fluid sample comprises a plurality of first species; and gelating the fluidic droplets to form a plurality of first gel beads comprising the first species, wherein one or more of the first species have one or more chemical functionalities.

In another embodiment, the method of making gel beads further comprises suspending the first gel beads in a third fluid sample comprising a plurality of second species; and reacting the one or more first species that have one or more chemical functionalities with one or more of the plurality of second species to functionalize the first gel beads with the one or more second species.

In another embodiment, the one or more first species that have one or more chemical functionalities are not reactive with the other first species.

In another embodiment, the chemical functionality is amino, ammonium, hydroxyl, mercapto, sulfone, sulfinic acid, sulfonic acid, thiocyanate, thione, thial, thiol, carboxyl, halocarboxy, halogen, imido, anhydrido, alkenyl, strained alkene, strained cycloalkene, alkynyl, strained alkyne, strained cycloalkyne, phenyl, benzyl, carbonyl, formyl, haloformyl, carbonato, ester, alkoxy, phenoxy, hydroperoxy, peroxy, ether, glycidyl, epoxy, hemiacetal, hemiketal, acetal, ketal, orthoester, orthocarbonate ester, amido, imino, imido, azido, azo, cyano, nitrato, nitrilo, nitrito, nitro, nitroso, pyridinyl, phosphinyl, phosphonic acid, phosphate, phosphoester, phosphodiester, boronic acid, boronic ester, borinic acid, borinic ester, acrylate, methacrylate, alkylacrylate, alkyne, terminal alkyne, nitrone, biotin, streptavidin, dibenzocyclooctyl, cholesterol, trans-cyclooctene, tetrazine, any derivatives thereof, or any combinations thereof.

In another embodiment, at least one of the first species is magnetic.

In another embodiment, at least one of the pluralities of first species is colored and designed to color the first gel beads.

In another embodiment, at least part of the gelation is reversible.

In another embodiment, the method of making gel beads further comprises dissolving the first gel beads.

In another embodiment, the method of making gel beads further comprises disrupting at least one of the first species to dissolve the first gel beads.

In another embodiment, one or more of the first species are second gel beads.

In one embodiment, there is a method of making gel beads, the method comprising: suspending a first fluid sample in a second fluid sample to form a plurality of fluidic droplets, wherein the first fluid sample comprises a plurality of species and solid templating beads, gel templating beads, or a combination thereof; gelating the fluidic droplets to form a plurality of gel beads using the solid templating beads, the gel templating beads, or a combination thereof, wherein the gel beads comprises the species and the solid templating beads, the gel templating beads, or a combination thereof.

In some embodiments, the plurality of first species comprise one or more monomers comprising a first chemical functionality that can facilitate crosslinking of the one or more monomers.

In some embodiments, the first chemical functionality comprises one or more of methacrylate, methacrylamide, acrylate, methacrylate, alkylacrylate, acrylamide, methacrylamide, alkylacrylamide, alkylmethacrylamide, strained alkene, strained cycloalkene, alkynyl, strained alkyne, strained cycloalkyne, epoxy, azido, dibenzocyclooctyl, or derivatives thereof.

In some embodiments, the plurality of first species comprise at least one monomer comprising a second chemical functionality that does not facilitate crosslinking of the one or more monomers.

In some embodiments, the second chemical functionality comprises one or more of amino, hydroxyl, mercapto, sulfone, thiol, halogen, strained alkene, strained cycloalkene, dibenzocyclooctyl, epoxy, hemiacetal, hemiketal, acetal, ketal, amido, imino, imido, carboxylic acid, acyl halide, or azido.

In some embodiments, the plurality of second species comprise at least one oligomer comprising a third chemical functionality that is configured to react with the second chemical functionality.

In some embodiments, the third chemical functionality comprises one or more of amino, hydroxyl, mercapto, sulfone, thiol, halogen, strained alkene, strained cycloalkene, dibenzocyclooctyl, epoxy, hemiacetal, hemiketal, acetal, ketal, amido, imino, imido, carboxylic acid, acyl halide, or azido.

In some embodiments, the at least one oligomer comprise nucleotides, locked nucleotides, proteins, peptides, or peptide nucleic acids.

In some embodiments, the gel beads are surface-functionalized with a second chemical functionality.

In some embodiments, the gel beads comprise polyacrylamide.

In some embodiments, the gel beads are surface-functionalized with an amino group.

In some embodiments, a total number of oligomers functionalized on the surface of the gel beads is at least 90% higher than a total number of oligomers functionalized to the bulk of the gel beads.

In some embodiments, the plurality of species comprises a reagent that leads to gelation.

In some embodiments, the plurality of species comprises a biological.

In some embodiments, the gel templating beads are surface functionalized with a chemical functionality that is configured to react with the species.

BRIEF DESCRIPTION OF THE DRAWINGS

The foregoing and other objects and advantages of the invention will be appreciated more fully from the following further description, with reference to the accompanying drawings. The skilled person in the art will understand that the drawings, described below, are for illustration purposes only. The drawings are not intended to limit the scope of the applicant's teachings in any way.

In the drawings:

FIG. 2 illustrates an example chemical reaction for producing azide-functionalized materials in accordance with aspects of the present disclosure;

FIG. 3 illustrates an example chemical reaction for reacting azide-functionalized material with DBCO-functionalized materials in accordance with aspects of the present disclosure;

FIG. 5 illustrates an example chemical reaction for producing DBCO-functionalized materials in accordance with aspects of the present disclosure;

Figure 6:
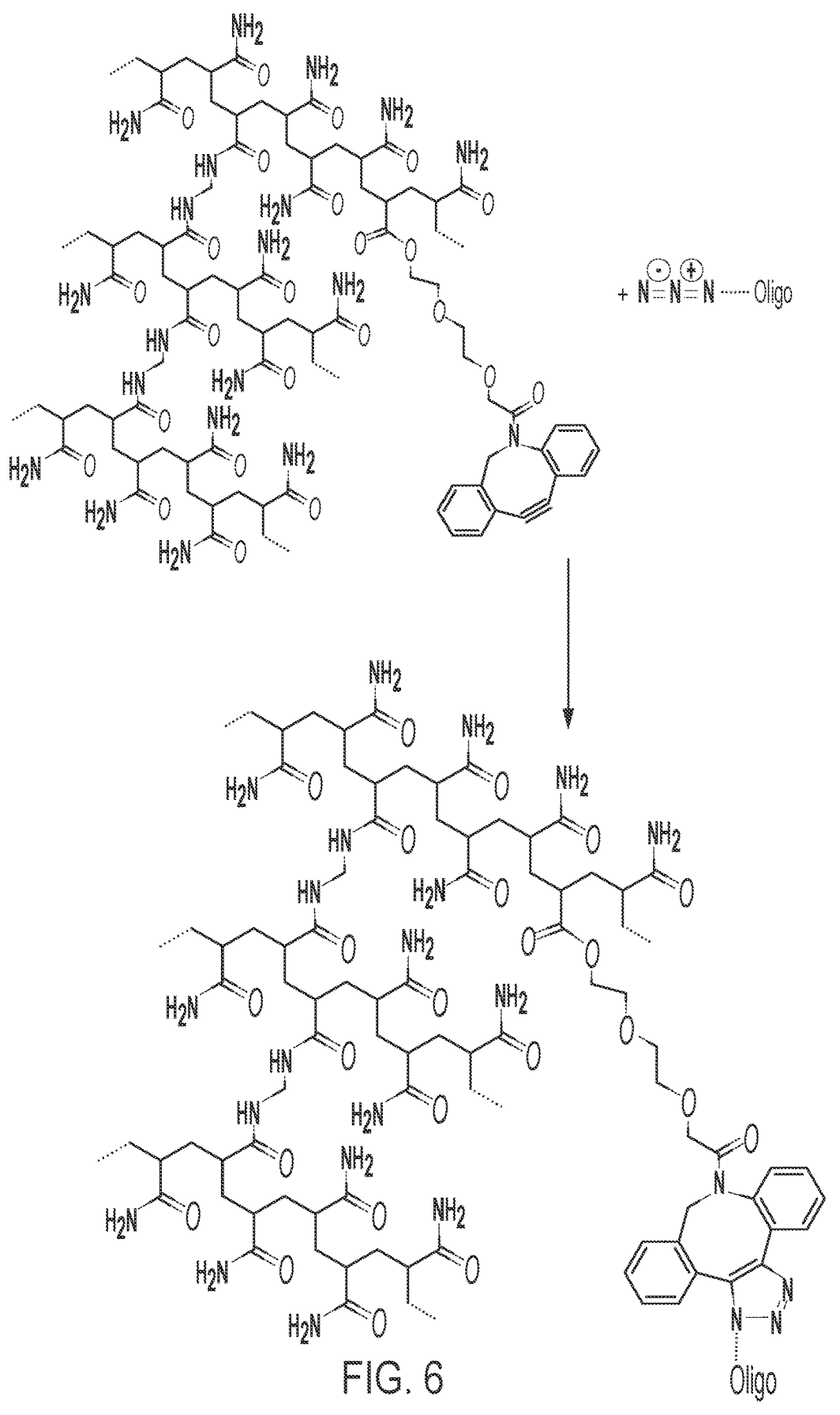

FIG. 6 illustrates an example chemical reaction for reacting DBCO-functionalized material with azide-functionalized materials in accordance with aspects of the present disclosure;

Figure 7:
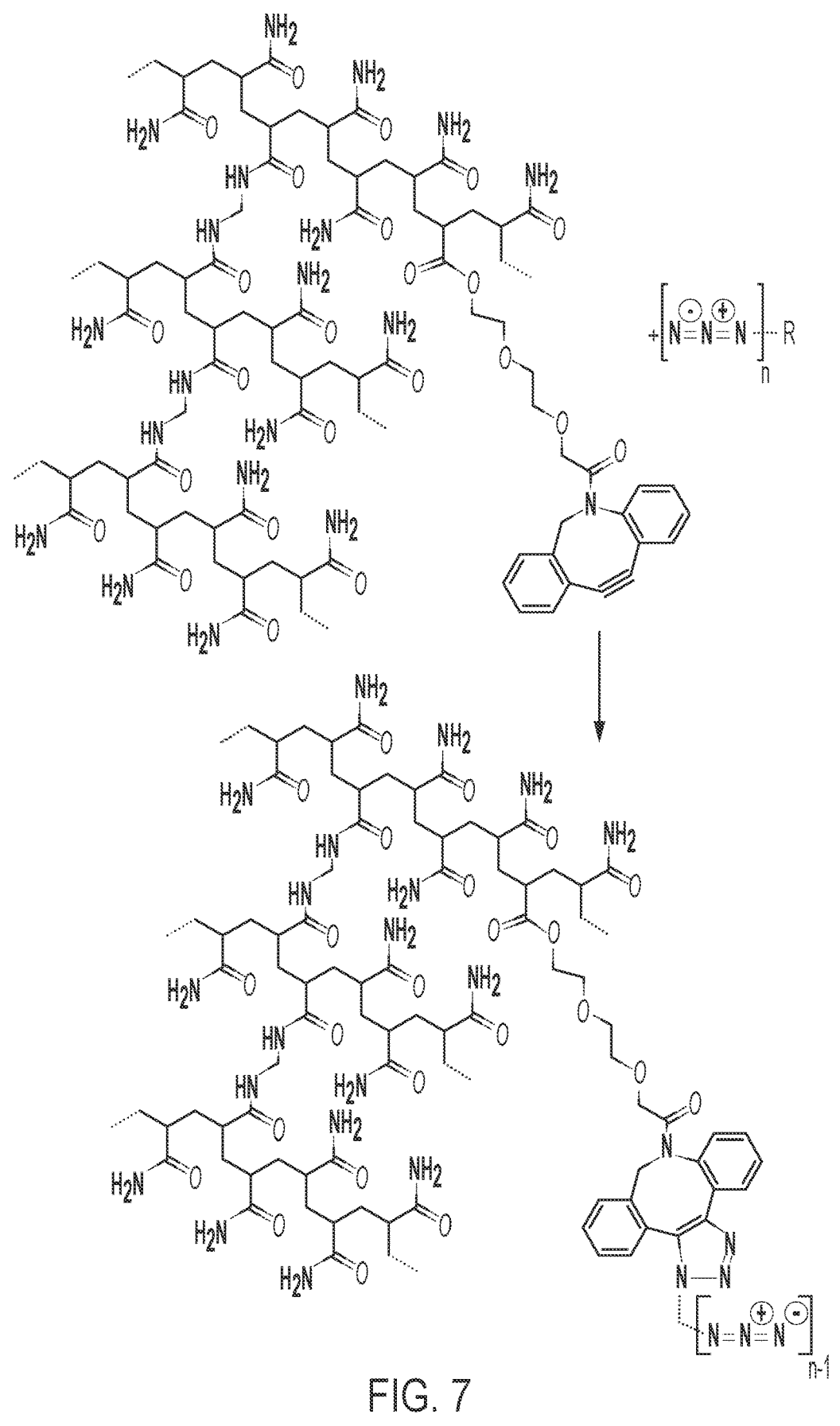

FIG. 7 illustrates an example chemical reaction for reacting DBCO-functionalized material with multi-azide-functionalized materials in accordance with aspects of the present disclosure;

DETAILED DESCRIPTION OF THE INVENTION

Figure 1:
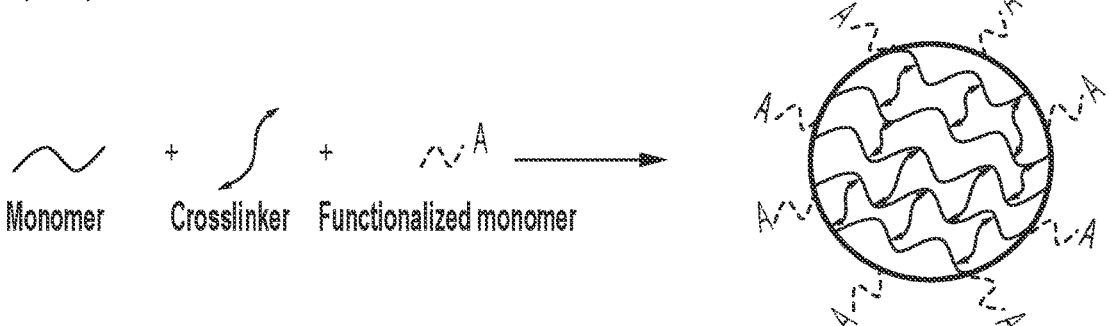
FIG. 1 schematically illustrates the synthesis and functionalization of materials in accordance with aspects of the present disclosure.

Before the present compositions and methods are described, it is to be understood that this invention is not limited to the particular processes, compositions, or methodologies described, as these may vary. The features illustrated or described herein in connection with one exemplary embodiment may be combined with the features of other embodiments. Such modifications and variations are intended to be included within the scope of the present invention. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. Nothing herein is to be construed as an admission that the invention is not entitled to antedate such disclosure by virtue of prior invention.

It must also be noted that as used herein and the appended claims, the singular forms "a," "an," and "the" include plural references unless the content clearly dictates otherwise. Thus, for example, reference to "a species" is a reference to "one or more species" and equivalents thereof known to those skilled in the art, and so forth.

The term "about" as used herein denotes a variation of at most 10% around a numerical value. Therefore, about 50% means in the range of 40%-60%.

The term "fluid" as used herein refers to liquid including, but not limited to, organic liquid, inorganic liquid, water, buffer, oil, mineral oils, hydrocarbon oils, vegetable oils, parafin oils, fluorinated oils, fully fluorinated oils, partially fluorinated oils, any derivatives thereof, and and y combinations thereof. The fluid can be a miscible fluid or a non-miscible fluid.

The term "species" as used herein refers to biologicals, chemicals, living materials, active materials, inactive materials, inert materials, any derivatives thereof, or any combinations thereof.

The term "biologicals" as used herein refers to living organisms and their products, including, but not limited to, cells, tissues, tissue products, blood, blood products, proteins, deoxyribonucleic acids, ribonucleic acids, nucleic acids, oligonucleotides, vaccines, antigens, antitoxins, viruses, microorganisms, fungi, yeasts, algae, bacteria, etc. One example of a biological can include microorganisms, such as pathogenic or non-pathogenic bacteria. Another example of biologicals can include viruses, viral products, or combinations thereof. The term "biologicals" can also include synthetic products, including, but not limited to, virus-imitating entities, synthetic strands of DNA, synthetic strands of RNA, synthetic oligonucleotides, any derivatives thereof, or any combinations thereof. In some embodiments, the biological is selected from the group consisting of cell, tissue, tissue product, blood, blood product, body fluid, product of body fluid, protein, vaccine, antigen, antitoxin, biological medicine, biological treatment, virus, microorganism, fungus, yeast, alga, bacterium, prokaryote, eukaryote, *Staphylococcus aureus, Streptococcus, Escherichia coli* (*E. coli*), *Pseudomonas aeruginosa, mycobacterium*, adenovirus, rhinovirus, smallpox virus, influenza virus, herpes virus, human immunodeficiency virus (HIV), rabies, chikungunya, severe acute respiratory syndrome (SARS), polio, malaria, dengue fever, tuberculosis, meningitis, typhoid fever, yellow fever, ebola, *shigella, listeria, yersinia*, West Nile virus, protozoa, fungi, *Salmonella enterica, Candida albicans, Trichophyton mentagrophytes*, poliovirus, *Enterobacter aerogenes, Salmonella typhi, Klebsiella pneumonia, Aspergillus brasiliensis*, and methicillin resistant *Staphylococcus aureus* (MRSA), any derivatives thereof, or any combinations thereof.

The term "bead" as used herein generally refers to a solid or semi-solid particle. The bead may be a gel particle and may include one or more smaller gel particles. The bead may be the product of polymerization. The bead may be flexible, compressible, and/or deformable. The bead may be rigid and/or dissolvable. The bead may be magnetic and/or responsive to magnetic field.

The term "monomer" as used herein refers to a chemical that can be polymerized to form a polymer, linear polymer, branched polymer, crosslinked polymer, copolymer, block copolymer, random copolymer, functionalized polymer, any derivatives thereof, or any combinations thereof.

The present invention is generally directed to beads, methods of making said beads, and methods of functionalizing said beads with one or more functional groups to form functionalized beads, such as universal functionalized beads, wherein the functional group can be a chemical group. The beads can be gel beads. The beads can be stable for an extended period of time. At any given time-point following manufacturing of a lot of such beads and during their life span, the one or more chemical groups of the whole or part of these lots can be reacted with complementary functionalities, which are part of chemical or biological entities of importance to biological applications. The complementary character can be based on physical attraction, without forming strong bonding, or chemical attraction leading to the formation of bonding between the chemical groups in or on the beads and the biological entities.

Entities of importance to biological applications can include materials known to selectively or universally bind same or other biological entities. Such entities can include oligonucleotides, nucleic acids, peptides, biotin, streptavidin, antibodies, heparin, chitosan, lactose, mono- and polysaccharides, other biological entities, and any derivatives thereof.

One skilled in the art would appreciate that one or more of the methods presented herein can have for advantage to eliminate the burden of making a new lot of beads each time a different biological entity is needed on these beads.

The beads disclosed herein, such as the universal functionalized beads, can be made, for example, by combining reactive monomers, initiators and other reagents, and applying controlled conditions that lead to crosslinking of monomers and generation of beads, which are mono- or poly-disperse in size.

The beads disclosed herein, such as the universal functionalized beads, can be made, for example, by combining reactive monomers, initiators and other reagents in one phase, emulsifying this phase with another non-miscible phase by using general emulsification techniques, such as shaking and agitation, or more engineered emulsification techniques, such as fluid co-flow techniques which include microfluidic techniques, followed with applying controlled conditions that lead to crosslinking of monomers and generation of beads, which are mono- or poly-disperse in size. The other non-miscible phase may or may not contain additional reactive monomers, initiators, and other reagents.

Certain embodiments comprise suspending a first fluid sample in a second fluid sample to form a plurality of fluidic droplets. In some embodiments, the first fluid sample comprises a fluid that is a non-fluorous phase. The non-fluorous phase may be a phase that is fluorophobic (e.g., hydrophilic, hydrophobic) in nature. In some embodiments, the second fluid sample comprises a second fluid that is immiscible with the first fluid. For example, according to some such embodiments, the second fluid may be a fluorous phase that is fluorophilic in nature. When the first fluid sample is suspended in a second fluid sample using general emulsification techniques (e.g., emulsification, microfluidics, etc.), a plurality of fluidic droplets comprising the first fluid sample can be generated.

In some such embodiments, the second fluid sample comprises a surfactant or surfactant mixture that can be used to stabilize (e.g., reduce the interfacial tension of) a fluid interface between the first fluid sample and the second fluid sample. That is, the use of a surfactant may assist with the formation of the plurality of fluidic droplets. In some such embodiments, the surfactant may be a fluoro-surfactant, a surfactant that comprises a first moiety soluble in a fluorous phase and a second moiety soluble in a non-fluorous phase. Non-limiting examples of surfactants that may be used include, but are not limited, to perfluoropolyether-polyethyleneglycol co-polymers, perfluoropolyether carboxylic acids, perfluoropolyether alcohols and perfluoroalkyl-polyethyleneglycol.

The first fluid samples include, but are not limited to, aqueous fluids and non-aqueous fluids that are not miscible with the second fluid. Non-limiting examples of first fluids include aqueous buffers, water containing reagents, hydrocarbon oils, and silicone oils.

In some embodiments, the first fluid sample comprises a plurality of first species that comprises reactive monomers and reagents having one or more chemical functionalities. The chemical functionalities are reactive groups that can react with other chemical functionalities to form bonds (e.g., covalent bonds, ionic bonds, etc.). In one set of embodiments, the plurality of first species comprise one or more monomers or reagents comprising a first chemical functionality that can assist with the crosslinking (e.g., polymerization, gelation) of the one or more monomers or reagents within the fluid droplets or beads. Non-limiting examples of a first chemical functionality include, but are not limited to, acrylate, methacrylate, alkylacrylate, acrylamide, methacrylamide, alkylacrylamide, alkylmethacrylamide, strained alkene, strained cycloalkene, alkynyl, strained alkyne, strained cycloalkyne, epoxy, azido, dibenzocyclooctyl, or derivatives thereof. In some embodiments, the first species is a non-biological entity. In some embodiments, the first chemical functionality is not a biological functionality, e.g., a functional or reactive group associated with a biological entity.

In some embodiments, the plurality of first species comprises at least one monomer or reagents comprising a second chemical functionality. For example, a second chemical functionality is a reactive group that differs from a first chemical functionality in terms of the types of reactions it can participate in. In some embodiments, unlike a first chemical functionality, a second chemical functionality does not facilitate or participate in the crosslinking of the one or more monomers or reagents within the fluidic droplet or bead. In some embodiments, the second chemical functionality may be substantially unreactive to the first chemical functionality. The second chemical functionality may instead, in some embodiments, participate in a chemical reaction that is not a polymerization reaction, as will be described in more detail below. In one such embodiment, the one or more first species comprising the second chemical functionality are substantially unreactive with the one or more of the first species comprising the first chemical functionality.

In some embodiments, the second chemical functionality may be functionalized or attached to a surface of a gel bead, as discussed elsewhere herein. FIG. 1 shows a non-limiting example of a gel bead having a plurality of second chemical functionalities (e.g., functionality A) attached to the bead's surface.

Non-limiting examples of a second chemical functionality include, but are not limited to amino, hydroxyl, mercapto, sulfone, thiol, halogen, strained alkene, strained cycloalkane, dibenzocyclooctyl, epoxy, hemiacetal, hemiketal, acetal, ketal, amido, imino, imido, carboxylic acid, acyl halide, or azido.

In some embodiments, the plurality of first species comprises a combination of monomers or reagents having at least one first chemical functionality and at least one second chemical functionality. For example, in one set of embodiments, the plurality of first species comprises a first group of monomers or reagents that are substituted with one or more of a first chemical functionalities (e.g., acrylamide monomers that are mono- or bis-substituted, etc). In some embodiments, the plurality of first species further comprises a second group of monomers or reagents that comprises at least one of the first chemical functionalities (e.g., acrylamide) and at least one of the second chemical functionalities (e.g., amino), such that the first chemical functionality of the second group can react with the first chemical functionality of the first group and the second chemical functionality of the second group is unreactive with the first chemical functionality of the first group.

FIG. 1 shows a non-limiting representation of such an embodiment of a plurality of first species. As shown in FIG. 1 (Step 1), the plurality of first species comprises a monomer comprising a first chemical functionality (e.g., acrylamide monomer), a crosslinker molecule comprising more than one first chemical functionalities (e.g., bis-substituted acrylamide molecule), and a functionalized monomer comprising a first chemical functionality and a second chemical functionality (e.g., monomer substituted with an amino and an acrylamide).

The functionalized monomer as shown in FIG. 1 comprising at least one first chemical functionality and at least one second chemical functionality may have any of a variety of molecular weights. In some such embodiments, the functionalized monomer may have a relatively small molecular weight. In some embodiments, the functionalized monomer has a molecular weight of greater than or equal to 50 g/mol, greater than or equal to 100 g/mol, greater than or equal to 150 g/mol, greater than or equal to 200 g/mol, greater than or equal to 250 g/mol, greater than or equal to 300 g/mol, greater than or equal to 350 g/mol, greater than or equal to 400 g/mol, or greater than or equal to 450 g/mol. In some instances, the functionalized monomer may have a molecular weight of less than or equal to 500 g/mol, less than or equal to 450 g/mol, less than or equal to 400 g/mol, less than or equal to 350 g/mol, less than or equal to 300 g/mol, less than or equal to 250 g/mol, less than or equal to 200 g/mol, less than or equal to 150 g/mol, or less than or equal to 100 g/mol. Combination of the above-referenced ranges are possible (e.g., greater than or equal to 50 g/mol and less than or equal to 500 g/mol; or greater than or equal to 100 g/mol and less than or equal to 200 g/mol). Other ranges are also possible.

The monomer as shown in FIG. 1 comprising a first chemical functionality may have any of a variety of molecular weights. In some such embodiments, the monomer may have a relatively small molecular weight. In some embodiments, the monomer has a molecular weight of greater than or equal to 50 g/mol, greater than or equal to 100 g/mol, greater than or equal to 150 g/mol, greater than or equal to 200 g/mol, greater than or equal to 250 g/mol, greater than or equal to 300 g/mol, greater than or equal to 350 g/mol, greater than or equal to 400 g/mol, or greater than or equal to 450 g/mol. In some instances, the monomer may have a molecular weight of less than or equal to 500 g/mol, less than or equal to 450 g/mol, less than or equal to 400 g/mol, less than or equal to 350 g/mol, less than or equal to 300 g/mol, less than or equal to 250 g/mol, less than or equal to 200 g/mol, less than or equal to 150 g/mol, or less than or equal to 100 g/mol. Combination of the above-referenced ranges are possible (e.g., greater than or equal to 50 g/mol and less than or equal to 500 g/mol; or greater than or equal to 100 g/mol and less than or equal to 200 g/mol). Other ranges are also possible.

The crosslinker molecule as shown in FIG. 1 comprising more than one first chemical functionalities may have any of a variety of molecular weights. In some such embodiments, the crosslinker molecule may have a relatively small molecular weight. In some embodiments, the crosslinker has a molecular weight of greater than or equal to 50 g/mol, greater than or equal to 100 g/mol, greater than or equal to 150 g/mol, greater than or equal to 200 g/mol, greater than or equal to 250 g/mol, greater than or equal to 300 g/mol, greater than or equal to 350 g/mol, greater than or equal to 400 g/mol, or greater than or equal to 450 g/mol. In some instances, the crosslinker molecule may have a molecular weight of less than or equal to 500 g/mol, less than or equal to 450 g/mol, less than or equal to 400 g/mol, less than or equal to 350 g/mol, less than or equal to 300 g/mol, less than or equal to 250 g/mol, less than or equal to 200 g/mol, less than or equal to 150 g/mol, or less than or equal to 100 g/mol. Combination of the above-referenced ranges are possible (e.g., greater than or equal to 50 g/mol and less than or equal to 500 g/mol; or greater than or equal to 100 g/mol and less than or equal to 200 g/mol). Other ranges are also possible.

As noted above, a plurality of fluidic droplets may be formed by suspending a first fluid sample in a second fluidic sample. Certain embodiments further comprise gelating the fluidic droplets described herein to form a plurality of first gel beads.

In some embodiments, the first fluid sample and/or the second fluidic sample may comprise an initiator that can be used to initiate a crosslinking (e.g., polymerization, gelation) of one or more of the first species (e.g., monomers or reagents comprising a first chemical functionality) within the fluid droplets. Any appropriate conventional or commercially available initiators may be used to initiate the gelation or polymerization reaction. In some embodiments, the resultant gel beads are crosslinked (e.g., chemically or physically crosslinked) particles that comprise a space-filling polymeric network. An example of such a gel bead is shown in FIG. 1, where a fluid droplet comprising a plurality of first species (e.g., monomer, crosslinker, functionalized monomer) has been crosslinked (e.g., polymerized, gelled) to form a gel bead.

In some embodiments, the first gel beads formed from the fluidic droplets are surface functionalized gel beads, e.g., beads that include a surface that is functionalized with a chemical functionality (e.g., a second chemical functionality; a second reactive group). For example, as shown in FIG. 1 (Step 1), the resultant gel bead comprises a polymeric network formed from a monomer comprising a first chemical functionality and a crosslinker molecule comprising one or more of a first chemical functionality. The resultant gel bead, as shown, has been surface functionalized with a functionalized monomer comprising an unreacted second chemical functionality "A". The second chemical functionality may include a different reactive group than the reactive group of the first functionality. In some embodiments, the first and second reactive groups are not reactive towards each other. While FIG. 1 shows an embodiment where the gel beads are surface functionalized with a second chemical functionality, it should be noted that the bulk (e.g., interior) of the gels may also be functionalized with the second chemical functionality.

In some embodiments, the surface-functionalized gel bead may be a gel bead comprising any of a variety of polymer network (e.g., polyacrylate, polyacrylamide, etc.) formed from a variety of first species and chemical functionalities described previously, and surface-functionalized with a variety of functional groups (e.g., second chemical functionality described previously). In one such embodiments, the gel beads may be surface-functionalized with an amino-group.

The plurality of (first) gel beads (and/or the fluidic droplets that are used to the form the plurality of (first) gel beads) may have any of a variety of particles sizes (e.g., diameter) disclosed herein. In some embodiments, the plurality of (first) gel beads (and/or the fluidic droplets that are used to form the plurality of (first) gel beads) may have a particle size (e.g., diameter) of greater than or equal to 1 micron, greater than or equal to 5 microns, greater than or equal to 10 microns, greater than or equal to 15 microns, greater than or equal to 20 microns, greater than or equal to 30 microns, greater than or equal to 40 microns, greater than or equal to 50 microns, greater than or equal to 60 microns, greater than or equal to 80 microns, greater than or equal to 100 microns, greater than or equal to 110 microns, greater than or equal to 120 microns, greater than or equal to 150 microns, greater than or equal to 200 microns, greater than or equal to 300 microns, greater than or equal to 400 microns, greater than or equal to 500 microns, greater than or equal to 600 microns, greater than or equal to 700 microns, greater than or equal to 800 microns, or greater than or equal to 900 microns. In some embodiments, the plurality of (first) gel beads (and/or the fluidic droplets that are used to the form the plurality of (first) gel beads) may have a particle size (e.g., diameter) of less than or equal to 1000 microns, less than or equal to 900 microns, less than or equal to 800 microns, less than or equal to 700 microns, less than or equal to 600 microns, less than or equal to 500 microns, less than or equal to 400 microns, less than or equal to 300 microns, less than or equal to 200 microns, less than or equal to 150 microns, less than or equal to 120 microns, less than or equal to 110 microns, less than or equal to 100 microns, less than or equal to 80 microns, less than or equal to 60 microns, less than or equal to 50 microns, less than or equal to 40 microns, less than or equal to 30 microns, less than or equal to 20 microns, less than or equal to 15 microns, less than or equal to 10 microns, or less than or equal to 5 microns. Combination of the above-referenced ranges are possible (e.g., greater than or equal to 1 micron and less than or equal to 1000 microns, greater than or equal to 10 microns and less than or equal to 120 microns, or greater than or equal to 40 microns and less than or equal to 70 microns). Other ranges are also possible. In embodiments in which a plurality of second gel beads is present, the plurality of second gel beads may independently have a particle size (e.g., diameter) in one or more of the above-referenced ranges.

In some embodiments, the plurality of (first) gel beads (and/or the fluidic droplets that are used to the form the plurality of (first) gel beads) may be substantially monodisperse. For example, the plurality of (first) gel beads (and/or the fluidic droplets that are used to the form the plurality of (first) gel beads) may have particle sizes (e.g., diameter) that deviates less than or equal to 15%, less than or equal to 12%, less than or equal to 10%, less than or equal to 5%, less than or equal to 2%, less than or equal to 1.5%, less than or equal to 1%, or less than or equal to 0.5% from an average particle size (e.g., number-based average, volume-based size, intensity-based average, etc.) of the gel beads (and/or the fluidic droplets that are used to the form the plurality of (first) gel beads). In some embodiments, the plurality of (first) gel beads (and/or the fluidic droplets that are used to the form the plurality of (first) gel beads) may have particle sizes (e.g., diameter) that deviates greater than or equal to 0.1%, greater than or equal to 0.5%, greater than or equal to 1%, greater than or equal to 1.5%, greater than or equal to 2%, greater than or equal to 5%, greater than or equal to 10%, or greater than or equal to 12% from an average particle size (e.g., number-based average, volume-based size, intensity-based average, etc.) of the gel beads (and/or the fluidic droplets that are used to the form the plurality of (first) gel beads). Combination of the above-referenced ranges are possible (e.g., greater than or equal to 0.1% and less than or equal to 15%, or greater than or equal to 0.5% and less than or equal to 10%). Other ranges are also possible. In embodiments in which a plurality of second gel beads is present, the plurality of second gel beads may independently have a deviation in particle size (e.g., diameter) in one or more of the above-referenced ranges with respect to the average particle size of the plurality of second gel beads.

The plurality of (first) gel beads may have any of a variety suitable values of porosity values. In some embodiments, the porosity of the gel beads may be greater than or equal to 0.1%, greater than or equal to 0.5%, greater than or equal to 1%, greater than or equal to 5%, greater than or equal to 10%, greater than or equal to 15%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95%, or greater than or equal to 99%. In some embodiments, the porosity of the plurality of (first) gel beads may be less than or equal to 99.9%, less than or equal to 99%, less than or equal to 95%, less than or equal to 90%, less than or equal to 80%, less than or equal to 70%, less than or equal to 60%, less than or equal to 50%, less than or equal to 40%, less than or equal to 30%, less than or equal to 20%, less than or equal to 10%, less than or equal to 5%, less than or equal to 1%, or less than or equal to 0.5%. Combination of the above-referenced ranges are possible (e.g., greater than or equal to 0.1% and less than or equal to 99.9%). Other ranges are also possible. In embodiments in which a plurality of second gel beads is present, the plurality of second gel beads may independently have a porosity in one or more of the above-referenced ranges.

In some embodiments, the number density of functionalized monomers comprising a second chemical functionality (e.g., functionalized polymer as shown in FIG. 1) attached on the surface of the gel beads may be relatively high. In some embodiments, the number density of functionalized monomers (e.g., number of functionalized monomers per volume of the gel bead) is greater than or equal to 10 per μL, greater than or equal to 100 per μL, greater than or equal to 1000 per μL, greater than or equal to 10,000 per μL, greater than or equal to 100,000 per μL, greater than or equal to 1,000,000 per μL, greater than or equal to 10,000,000 per μL, greater than or equal to 100,000,000 per μL, greater than or equal to 1,000,000,000 per μL, greater than or equal to 10,000,000,000 per μL, greater than or equal to 100,000, 000,000 per μL, greater than or equal to 1,000,000,000,000 per μL, greater than or equal to 10,000,000,000,000 per μL, or greater than or equal to 100,000,000,000,000 per μL. In some embodiments, the number density of functionalized monomers is less than or equal to 1,000,000,000,000,000 per μL, less than or equal to 100,000,000,000,000 per μL, less than or equal to 10,000,000,000,000 per μL, less than or equal to 1,000,000,000,000 per μL, less than or equal to 100,000,000,000 per μL, less than or equal to 10,000,000, 000 per μL, less than or equal to 1,000,000,000 per μL, less than or equal to 100,000,000 per μL, less than or equal to 10,000,000 per μL, less than or equal to 1,000,000 per μL, less than or equal to 100,000 per μL, less than or equal to 10,000 per μL, less than or equal to 1,000 per μL, or less than or equal to 100 per μL. Combination of the above-referenced ranges are possible (e.g., greater than or equal to 10 per μL and less than or equal to 1,000,000,000,000,000 per μL). Other ranges are also possible.

In some embodiments, the surface-functionalized gel beads (e.g., as shown FIG. 1, Step 1) may be further surface functionalized with additional functionalities (e.g., third functionalities, fourth functionalities, etc.) using any of a variety of chemistries, as described elsewhere herein (e.g., as shown in FIG. 1, Step 2). In some embodiments, each of the functionalities may include different reactive groups that are different or the same from one another, and may each independently be chosen from the chemical functionalities described herein.

In some embodiments, the additional functionalization may be carried out by first suspending the first gel beads in a third fluid sample comprising a plurality of second species. In one set of embodiments, the third fluid sample may comprise a fluid phase that is non-fluorous, e.g., such that the gel beads may be dispersed (e.g., dispersed uniformly) in the fluid phase. In some embodiments, the plurality of second species in the third fluid sample may comprise any of a variety of species that include, but is not limited to, oligomers, biological entities, monomers, etc., as described elsewhere herein.

In one set of embodiments, one or more of the plurality of second species may comprise one or more of a third chemical functionality that is configured to react with the second chemical functionality described previously. In some embodiments, one or more first species that have one or more chemical functionalities (e.g., second chemical functionalities) may be reacted with one or more of the plurality of second species to functionalize the first gel beads with the one or more second species.

For example, as noted above, the first gel beads may be surface functionalized with a plurality of second chemical functionalities (e.g., chemical functionality A as shown in FIG. 1 (Step 1)). Subsequently, according to some such embodiments, the surface functionalized gel beads (e.g., gel bead as shown in FIG. 1, Step 2) may be suspended in a third fluid sample comprising a plurality of second species comprising a chemical functionality (e.g., chemical functionality B as shown in FIG. 1, Step 2). As shown, the third chemical functionality on the second species (e.g., chemical functionality B) may react with second chemical functionality (e.g., chemical functionality A) on the beads, to form a new chemical functionality C.

Examples of third chemical functionality include, but are not limited to, amino, hydroxyl, mercapto, sulfone, thiol, halogen, strained alkene, strained cycloalkane, epoxy, hemiacetal, hemiketal, acetal, ketal, amido, imino, imido, carboxylic acid, acyl halide, or azido.

Any appropriate chemistries described herein (e.g., click chemistry) may be employed to react the second chemical functionalities (e.g., shown as functionality A in FIG. 1) with the third chemical functionalities (e.g., shown as functionality B in FIG. 1). For example, in one set embodiments, the plurality of second species (e.g., biologically important oligomers) may be conjugated to a plurality of functional groups that are attached on the gel beads via any of a variety of bioconjugation methods. In one specific set of embodiments, the plurality of second species comprises oligomers that are configured to react with functional groups (e.g., amino-group) attached on the gel beads (e.g., polyacrylamide gel beads) to form gel beads functionalized with oligomers. In some embodiments, the plurality of second species may comprise chemical and/or biological species.

The second species comprising a third functionality (e.g., B as shown in FIG. 1) may have any of a variety of molecular weights. Depending on the type of second species (e.g., monomer, oligomer, biological entities, etc.), the molecular weight may vary widely. In embodiments where the second species are oligomers (as shown in FIG. 1), the oligomers may have molecular weight of greater than or equal to 0.9 kDa, greater than or equal to 1 kDa, greater than or equal to 5 kDa, greater than or equal to 10 kDa, greater than or equal to 20 kDa, greater than or equal to 30 kDa, greater than or equal to 40 kDa, greater than or equal to 50 kDa, greater than or equal to 50 kDa, greater than or equal to 60 kDa, greater than or equal to 70 kDa, greater than or equal to 80 kDa, or greater than or equal to 90 kDa. In some instances, the oligomers may have a molecular weight of less than or equal to 100 kDa, less than or equal to 90 kDa, less than or equal to 80 kDa, less than or equal to 70 kDa, less than or equal to 60 kDa, less than or equal to 50 kDa, less than or equal to 40 kDa, less than or equal to 30 kDa, less than or equal to 20 kDa, less than or equal to 10 kDa, less than or equal to 5 kDa, or less than or equal to 1 kDa. Combination of the above-referenced ranges are possible (e.g., greater than or equal to 0.9 kDa and less than or equal to 100 kDa). Other ranges are also possible.

As noted above, the gel beads may be surface functionalized with a plurality of second species (e.g., oligomer). In some embodiments, at least a portion of the bulk (e.g., interior) of the gel beads may also be functionalized a plurality of second species. The distribution of the plurality of second species functionalized to the surface of the gel beads and those functionalized to the bulk (e.g., an interior portion) of the gel beads may be substantially non-uniform, according to some embodiments.

For instance, in some such embodiments, a total number of second species (e.g., oligomers) functionalized at the surface of the gel beads is at least 50%, at least 60%, at least 70%, at least 80%, at least 90%, at least 95%, or at least 99% higher than a total number of second species (e.g., oligomers) functionalized to or present in the bulk of the gel beads (e.g., an interior portion of the gel beads). In some embodiments, a total number of second species (e.g., oligomers) functionalized at the surface of the gel beads is no more than 99.99%, no more than 95%, no more than 95%, no more than 90%, no more than 80%, no more than 70%, or no more than 60% higher than a total number of second species (e.g., oligomers) functionalized to or present in the bulk of the gel beads (e.g., an interior portion of the gel beads). Combination of the above-referenced ranges are possible (e.g., at least 50% and no more than 99.99%). Other ranges are also possible. In some embodiments, a negligible amount, if any, of second species is functionalized to the bulk (e.g., an interior portion) of the gel beads.

In some embodiments, a number density of second species (e.g., oligomers) functionalized at the surface of the gel beads is at least 50%, at least 60%, at least 70%, at least 80%, at least 90%, at least 95%, or at least 99% higher than a number density of second species (e.g., oligomers) functionalized to the bulk (e.g., an interior portion) of the gel beads. In some embodiments, a number density of second species (e.g., oligomers) functionalized at the surface of the gel beads is no more than 99.99%, no more than 95%, no more than 95%, no more than 90%, no more than 80%, no more than 70%, or no more than 60% higher than a number density of second species (e.g., oligomers) functionalized to the bulk (e.g., an interior portion) of the gel beads. Combination of the above-referenced ranges are possible (e.g., at least 50% and no more than 99.99%). Other ranges are also possible.

In some embodiments, the second species may comprise oligomers, e.g., photo-cleavable oligomers. Photo-cleavable oligomers are oligomers that can be cleaved or fragmented when exposed to a particular wavelength of light. In some embodiments, photo-cleavable oligomers may be functionalized onto surface-functionalized gel beads (e.g., amine-functionalized gel beads), and subsequently cleaved from the surface of the gel beads upon exposure to light (e.g., UV light). Non-limiting examples of oligomers include nucleotides, locked nucleotides, proteins, peptides, peptide nucleic acids, etc.

In some embodiments, the beads disclosed herein, such as the universal functionalized beads, can be made, for example, by combining reactive monomers, initiators and other reagents with pre-made beads in one phase, emulsifying this phase with another non-miscible phase by using general emulsification techniques, such as shaking and agitation, or more engineered emulsification techniques, such as fluid co-flow techniques which include microfluidic techniques. These steps may be followed with applying controlled conditions that lead to crosslinking of monomers and, in some embodiments, generation of a shell around the pre-made beads, leading to the formation of shelled beads, which are mono- or poly-disperse in size. This process of adding shells to existing structures, which include beads, could be repeated multiple times. The other non-miscible phase may or may not contain additional reactive monomers, initiators and other reagents.

In some embodiments, the surface functionalized gel beads may be further employed as templating beads to form a variety of larger structures. Such structures include, but are not limited to, fluidic droplets that encapsulates one or more gel beads, and/or larger gel beads that encapsulates one or more gel beads.

In some embodiments, a fluid sample comprising a plurality of species and templating beads suspended in a fluid phase (e.g., non-fluorous phase) may be dispersed in a non-miscible fluid phase (e.g., a fluorous phase) to form a plurality of fluidic droplets containing the fluid sample. It should be noted that the templating beads may comprise surface-functionalized gel beads described previously, other solid templating beads (e.g., magnetic beads), or a combination thereof. In some embodiments, a surfactant as described herein may be used to stabilize the fluidic droplets in the non-miscible fluid phase. The plurality of species may comprise any of a variety of species described previously, e.g., biologicals, oligomers, monomers, etc.

In one set of embodiments, the fluidic droplets comprise a plurality of biologicals and/or a plurality of monomers or reagents that may be used to gel the fluidic droplet. For instance, the plurality of monomers or reagents may include monomers having a first chemical functionality (e.g., acrylate, acrylamide, etc.) or other gelating reagents (e.g., agarose, etc.), and/or initiators that can initiate the cross-linking or gelation of the monomer or reagents, as described elsewhere herein.

In some embodiments, the fluid droplets comprising the templating beads may be gelated to form a plurality of gel beads having sizes that are larger than the encapsulated templating beads. For example, the resultant gel beads may have particle sizes (e.g., diameters) and/or volumes that are at least 5%, at least 10%, at least 20%, at least 30%, at least 50%, at least 75%, at least 100%, or at least 200% larger than the size of the encapsulated templating beads. In some embodiments, the resultant gel beads may have particle sizes (e.g., diameters) and/or volumes that are no more than 200%, no more than 100%, no more than 75%, no more than 50%, no more than 30%, no more than 20%, no more than 10%, or no more than 5% larger than the size of the encapsulated templating beads. Combination of the above-referenced ranges are possible (e.g., at least 5% and no more than 200%). Other ranges are also possible.

In some embodiments, the resulting gel beads may have a size that is relatively monodisperse. For example, the gel beads may have particle sizes that deviate less than or equal to 15%, less than or equal to 12%, less than or equal to 10%, less than or equal to 5%, less than or equal to 2%, less than or equal to 1.5%, less than or equal to 1%, or less than or equal to 0.5% from an average particle size (e.g., number-based average, volume based size, intensity-based average, etc.) of the gel beads. In some embodiments, the gel beads may have particle sizes that deviate greater than or equal to 0.1%, greater than or equal to 0.5%, greater than or equal to 1%, greater than or equal to 1%, greater than or equal to 1.5%, greater than or equal to 2%, greater than or equal to 5%, greater than or equal to 10%, greater than or equal to 12%, or greater than or equal to 15% from an average particle size (e.g., number-based average, volume based size, intensity-based average, etc.) of the gel beads. Combination of the above-referenced ranges are possible (e.g., greater than or equal to 0.1% and less than or equal to 15%; or greater than or equal to 0.5% and less than or equal to 10%). Other ranges are also possible.

The gel beads comprising a plurality of the templating beads may have any of a variety of particle sizes (e.g., diameters). In some embodiments, the gel beads that comprise a plurality of the templating beads may have a particle size (e.g., diameter) of greater than or equal to 5 microns, greater than or equal to 10 microns, greater than or equal to 15 microns, greater than or equal to 20 microns, greater than or equal to 30 microns, greater than or equal to 40 microns, greater than or equal to 50 microns, greater than or equal to 60 microns, greater than or equal to 80 microns, greater than or equal to 100 microns, greater than or equal to 110 microns, greater than or equal to 120 microns, or greater than or equal to 150 microns. In some embodiments, the gel beads that comprise a plurality of the templating beads may have a particle size (e.g., diameter) of less than or equal to 200 microns, less than or equal to 150 microns, less than or equal to 120 microns, less than or equal to 110 microns, less than or equal to 100 microns, less than or equal to 80 microns, less than or equal to 60 microns, less than or equal to 50 microns, less than or equal to 40 microns, less than or equal to 30 microns, less than or equal to 20 microns, less than or equal to 15 microns, or less than or equal to 10 microns. Combination of the above-referenced ranges are possible (e.g., greater than or equal to 5 microns and less than or equal to 200 microns). Other ranges are also possible.

A gel bead comprising one or more templating beads may have any of a variety of structures. In one set of embodiments, the gel beads comprise a single templating bead inside the droplet and thus have a core-shell morphology. In one set of embodiments, the gel beads comprise multiple templating beads inside the droplet and thus have a multi-core shell morphology.

In some embodiments, the shell of a gel bead comprising templating beads may have any of a variety of shell thickness. For instance, a ratio of shell thickness to a size (e.g., diameters) of the encapsulated templating beads may be greater than or equal to 1:20, greater than or equal to 1:10, greater than or equal to 1:5, greater than or equal to 1:4, greater than or equal to 1:3, greater than or equal to 1:2, greater than or equal to 1:1, greater than or equal to 2:1, greater than or equal to 3:1, greater than or equal to 4:1, greater than or equal to 5:1, or greater than or equal to 10:1. In some embodiments, the ratio of shell thickness to a size (e.g., diameters) of the encapsulated templating beads may be less than or equal to 20:1, less than or equal to 10:1, less than or equal to 5:1, less than or equal to 4:1, less than or equal to 3:1, less than or equal to 2:1, less than or equal to 1:1, less than or equal to 1:2, less than or equal to 1:3, less than or equal to 1:4, less than or equal to 1:5, or less than or equal to 1:10. Combination of the above-referenced ranges are possible (e.g., greater than or equal to 1:20 and less than or equal to 20:1). Other ranges are also possible.

In some embodiments, a gel bead comprising templating beads may have any of a variety of weight ratios of polymers in the shell versus polymers in the templating beads. In some embodiments, the weight ratio of the amount of polymers in the shell versus the amount of polymers in the templating beads may be greater than or equal to 1:20, greater than or equal to 1:10, greater than or equal to 1:5, greater than or equal to 1:4, greater than or equal to 1:3, greater than or equal to 1:2, greater than or equal to 1:1, greater than or equal to 2:1, greater than or equal to 3:1, greater than or equal to 4:1, greater than or equal to 5:1, or greater than or equal to 10:1. In some embodiments, the weight ratio of the amount of polymers in the shell versus the amount of polymers in the templating beads may be less than or equal to 20:1, less than or equal to 10:1, less than or equal to 5:1, less than or equal to 4:1, less than or equal to 3:1, less than or equal to 2:1, less than or equal to 1:1, less than or equal to 1:2, less than or equal to 1:3, less than or equal to 1:4, less than or equal to 1:5, or less than or equal to 1:10. Combination of the above-referenced ranges are possible (e.g., greater than or equal to 1:20 and less than or equal to 20:1). Other ranges are also possible.

The beads disclosed herein, such as the universal functionalized beads, can be physically separated by filtration, decantation, precipitation, any derivatives thereof, or any combinations thereof.

With reference now to FIG. 1, gel beads can be formed by polymerization of a monomer, such as for example and without limitation acrylate monomers, in the presence of one or more initiators. One or more of the monomers can include an additional functionality such as, for example and without limitation, a functionality other than acrylate. This additional functionality will be available for further reactions following the formation of the gel beads (FIG. 1). The further reactions can be with linear molecules (FIG. 1, Step 2, Mode 1) or with branched molecules (FIG. 1, Step 2, Mode 2).

In one example, gel beads are formed by polymerization of acrylate monomers in the presence of an initiator. One or more of the acrylate monomers include a click chemistry functionality, which will be available for further reactions following the formation of the gel beads.

In another example, gel beads are formed by polymerization of acrylate monomers in the presence of an initiator and of magnetic or paramagnetic particles. One or more of the acrylate monomers include a functionality different than acrylate. This different functionality will be available for further reactions following the formation of the gels.

In another example, gels are formed by polymerization of acrylate monomers in the presence of an initiator and of magnetic or paramagnetic particles. One or more of the acrylate monomers include a click chemistry functionality, which will be available for further reactions following the formation of the gels.

In another example, gels are formed by polymerization of acrylate monomers in the presence of an initiator and in the presence or absence of magnetic or paramagnetic particles. Furthermore, the acrylate monomers incorporate cleavable moieties allowing dissolution of the gel structure on demand. In addition, one or more of the acrylate monomers include a functionality different than acrylate. This different functionality will be available for further reactions following the formation of the gel beads.

In another example, gels are formed by polymerization of acrylate monomers in the presence of an initiator and in the presence or absence of magnetic or paramagnetic particles. Furthermore, the acrylate monomers incorporate cleavable moieties allowing dissolution of the gel structure on demand. Furthermore, one or more of the acrylate monomers include a click chemistry functionality, which will be available for further reactions following the formation of the gels.

Figure 2:
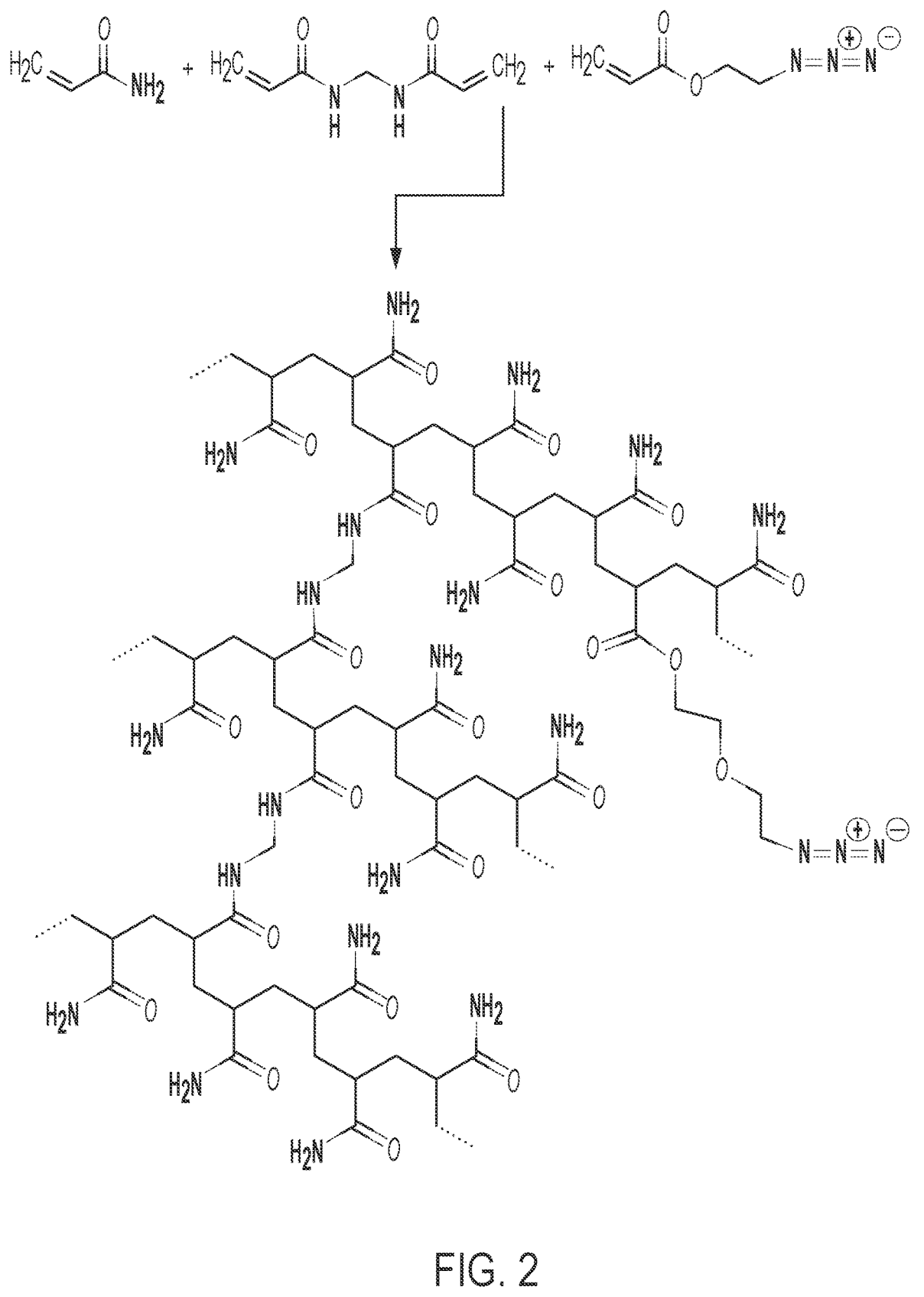
Figure 3:
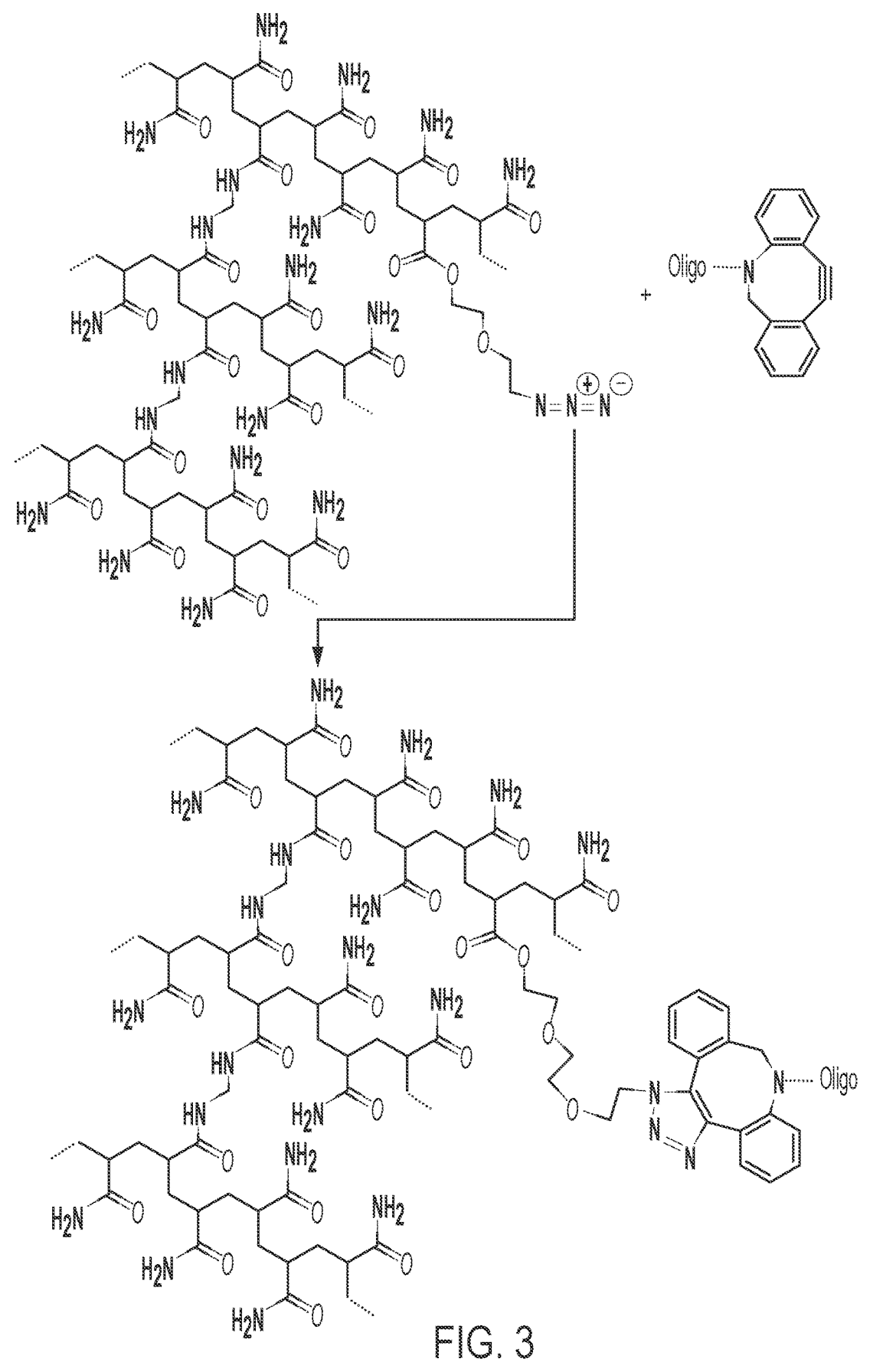
Figure 4:
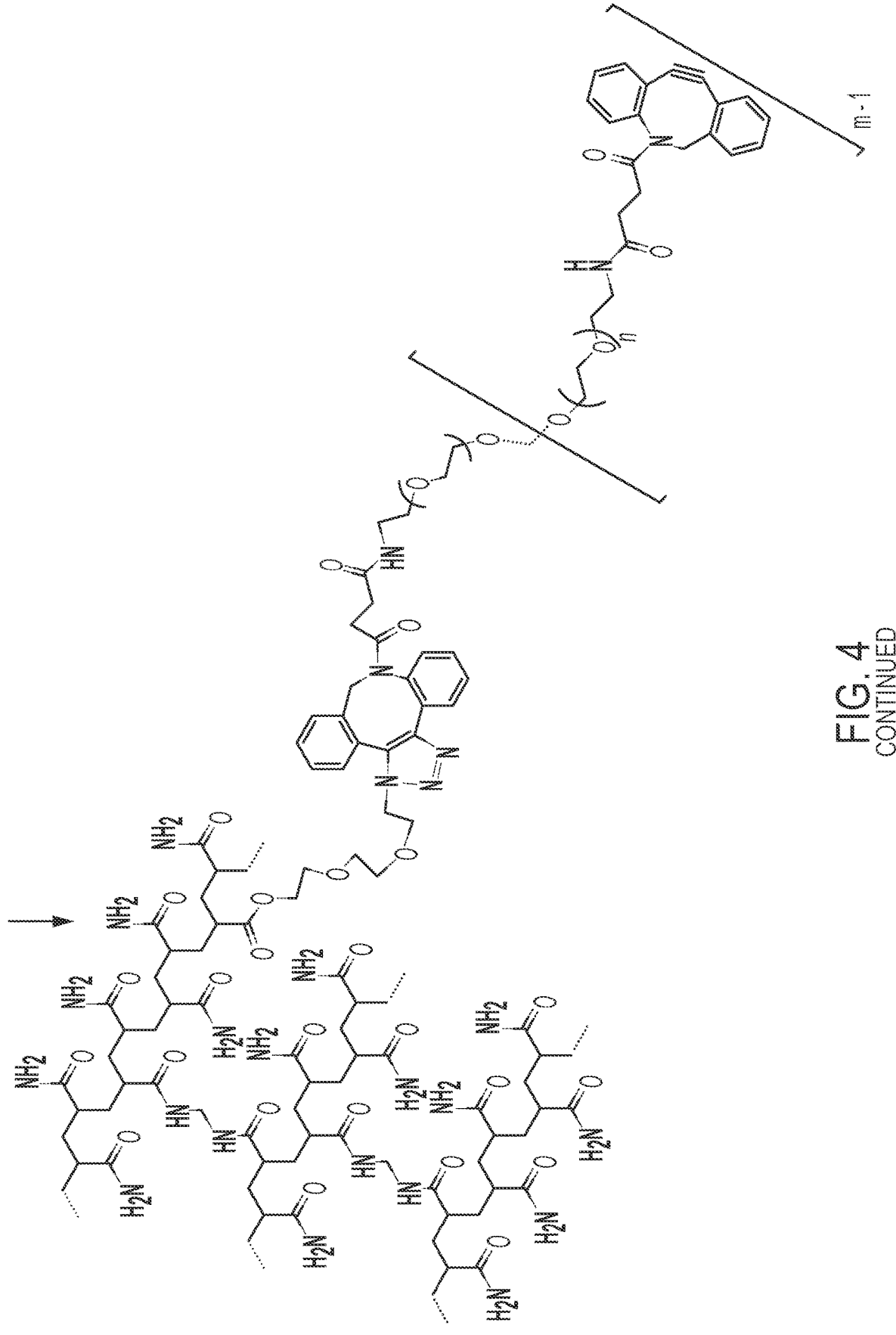
FIG. 4 illustrates an example chemical reaction for reacting multi-DBCO-functionalized material with azide-functionalized materials described in FIG. 2 in accordance with aspects of the present disclosure.

With reference now to FIGS. 2-4, azide functionalized gel can be made by incorporating a bifunctional material containing one or multiple azide functionalities and one or multiple acrylate functionalities. One or several acrylate functionalities in the bifunctional material will polymerize with the gel forming materials, which include acrylate monomers and bis-acrylate crosslinkers. The azide functionalities in the bifunctional material will not react during the formation of the gel beads and will remain available for further functionalization of the formed gels (FIG. 2). Further functionalization could include DBCO-containing oligos (FIG. 3). Another further functionalization could include branched DBCO-containing materials where a fraction of available DBCO functionalities react with existing azide functionalities (FIG. 4) and the non-reacted DBCO functionalities remain available for further reactions with, for example, azide-containing materials.

Figure 5:
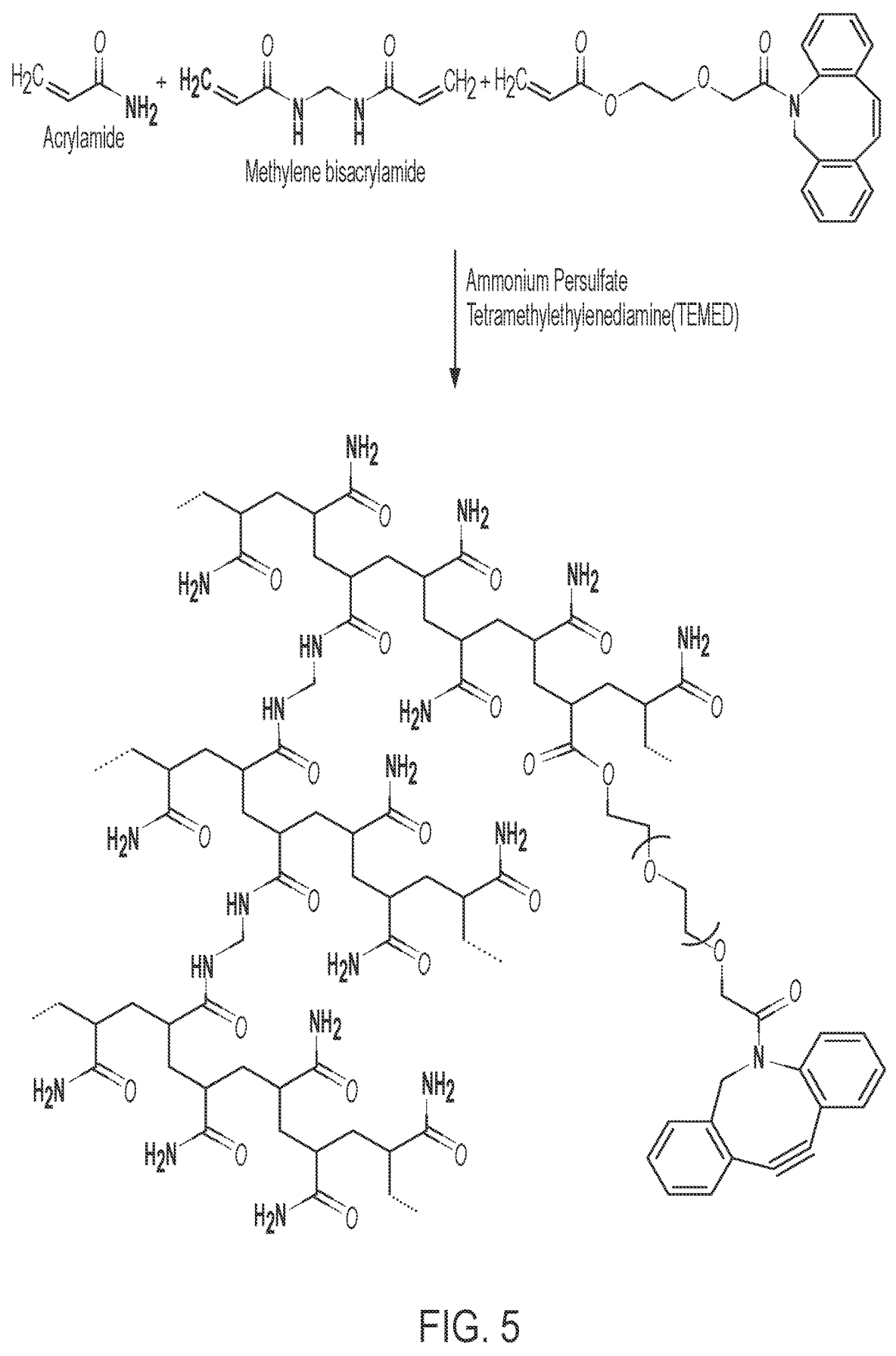

With reference now to FIG. 5, DBCO functionalized gel can be made by incorporating a bifunctional material containing one or multiple DBCO functionalities and one or multiple acrylate functionalities. One or several acrylate functionalities in the bifunctional material will polymerize with the gel forming materials, which include acrylate monomers and bis-acrylate crosslinkers. The DBCO functionalities in the bifunctional material will not react during the formation of the gel beads and will remain available for further functionalization of the formed gels (FIG. 5). Examples of further functionalization include reactions with azide-functionalized materials. Also, further functionalization could include azide-containing oligos. Another further functionalization could include branched azide-containing materials where a fraction of available azide functionalities react with existing DBCO functionalities and the non-reacted azide functionalities remain available for further reactions with, for example, DBCO-containing materials.

In some embodiments, the chemical includes, without limitation, amino, ammonium, hydroxyl, mercapto, sulfone, sulfinic acid, sulfonic acid, thiocyanate, thione, thial, thiol, carboxyl, halocarboxy, halogen, imido, anhydrido, alkenyl, strained alkene, strained cycloalkene, alkynyl, strained alkyne, strained cycloalkyne, phenyl, benzyl, carbonyl, formyl, haloformyl, carbonato, ester, alkoxy, phenoxy, hydroperoxy, peroxy, ether, glycidyl, epoxy, hemiacetal, hemiketal, acetal, ketal, orthoester, orthocarbonate ester, amido, imino, imido, azido, azo, cyano, nitrato, nitrilo, nitrito, nitro, nitroso, pyridinyl, phosphinyl, phosphonic acid, phosphate, phosphoester, phosphodiester, boronic acid, boronic ester, borinic acid, borinic ester, acrylate, methacrylate, alkylacrylate, alkyne, terminal alkyne, nitrone, biotin, streptavidin, dibenzocyclooctyl, cholesterol, trans-cyclooctene, tetrazine, any derivatives thereof, or any combinations thereof.

In some embodiments, the chemical is a chemical group, chemical functionality, functional group, functional material, molecule, charged molecule, reagent, catalyst, monomer, any derivatives thereof, or any combinations thereof.

In some embodiments, the functionalized material is a mono-functionalized material, bi-functionalized material, or poly-functionalized material.

In one embodiment, beads are formed by emulsion gelation. Emulsions are made of two or more immiscible phases and where one or more of these phases contain reagents designed or selected to react and form insoluble materials, such as gel materials.

In another embodiment, formed beads can enclose large and/or small molecules such as biological or chemical molecules or samples.

In yet another embodiment, gelation of emulsions containing smaller beads may lead to the formation of larger beads which enclose the smaller beads.

In an example embodiment, beads are formed by water-in-oil emulsion gelation, where the water droplets and/or the continuous oil phase contain reagents leading to the transformation of the droplets into gel beads.

In another example embodiment, beads are formed by water-in-oil emulsion gelation, where the water droplets contain reagents leading to the transformation of the droplets into gel spheres and where the aforementioned reagents include functionalities that remain non-reacted. The non-reacted functionality becomes available for further reactions after gelation.

In an example embodiment, reagents leading to gelation include acrylate and methacrylate monomers which could polymerize and crosslink.

In another example embodiment, reagents leading to gelation include acrylate and methacrylate monomers which could polymerize and crosslink. Reagents also include hetro-bifunctional monomers of acrylate and another functionality such as, for example and without limitation, azide, dibenzocyclooctyne (DBCO), and/or other click chemistry functionalities, that is expected to remain unreacted during gelation.

In yet another example embodiment, the formed gels which include non-reacted functionalities can be further reacted with other groups which contain functionalities known to interact and/or react with the aforementioned non-reacted functionalities.

In an example embodiment, the formed gels which include unreacted azides can be further reacted with other groups such as oligomers containing DBCO, leading to the formation of gels decorated with oligomers.

In yet another example embodiment, the formed gels which include unreacted DBCO can be further reacted with other groups such as oligomers containing azide, leading to the formation of gels decorated with oligomers.

In some embodiments, the formed gels can be used for the capture of biologicals in fluids. These gels should not dissolve in the aforementioned fluids.

In some embodiments, the disclosed methods and gels can be used in a number of applications including, for examples, pharmaceuticals, diagnostics, prophylactics, therapeutics, and environmental.

In some embodiments, the disclosed methods and gels can be used in microfluidic setups. Such setups have the advantage of allowing the study of reactions and interactions on a very small microscopic scale, which leads to amplifying signals and minimizing noises due to irrelevant reactions and interactions.

In some embodiments, the disclosed methods and gels combined with target biologicals can be combined with a non-miscible fluid. The mixture can then be emulsified via shaking, vortexing, other more technical emulsification procedures, or any combinations thereof. The resulting emulsion can be composed of droplets suspended in the non-miscible fluid. Each droplet can contain gels, target biologicals, or combinations thereof.

In yet another embodiment, the disclosed methods and gels combined with target biologicals can be combined with a non-miscible fluid. The mixture can then be emulsified via shaking, vortexing or other more technical emulsification procedures, or combinations thereof. The resulting emulsion can be composed of droplets suspended in the non-miscible fluid. Each droplet can contain gels, target biologicals, or combinations thereof. Furthermore, each water droplet can contain additional reagents leading to the transformation of the droplets into gel beads bigger than and including the existing gel beads and also including the other components of the droplets.

EXAMPLES

The following Examples further illustrate the salient aspects of the invention. The Examples are provided only for illustration purposes and are not intended to necessarily indicate the optimal ways of practicing the invention or optimal results that can be obtained.

Example 1

DBCO-Functionalized Gel Beads

Figure 8:
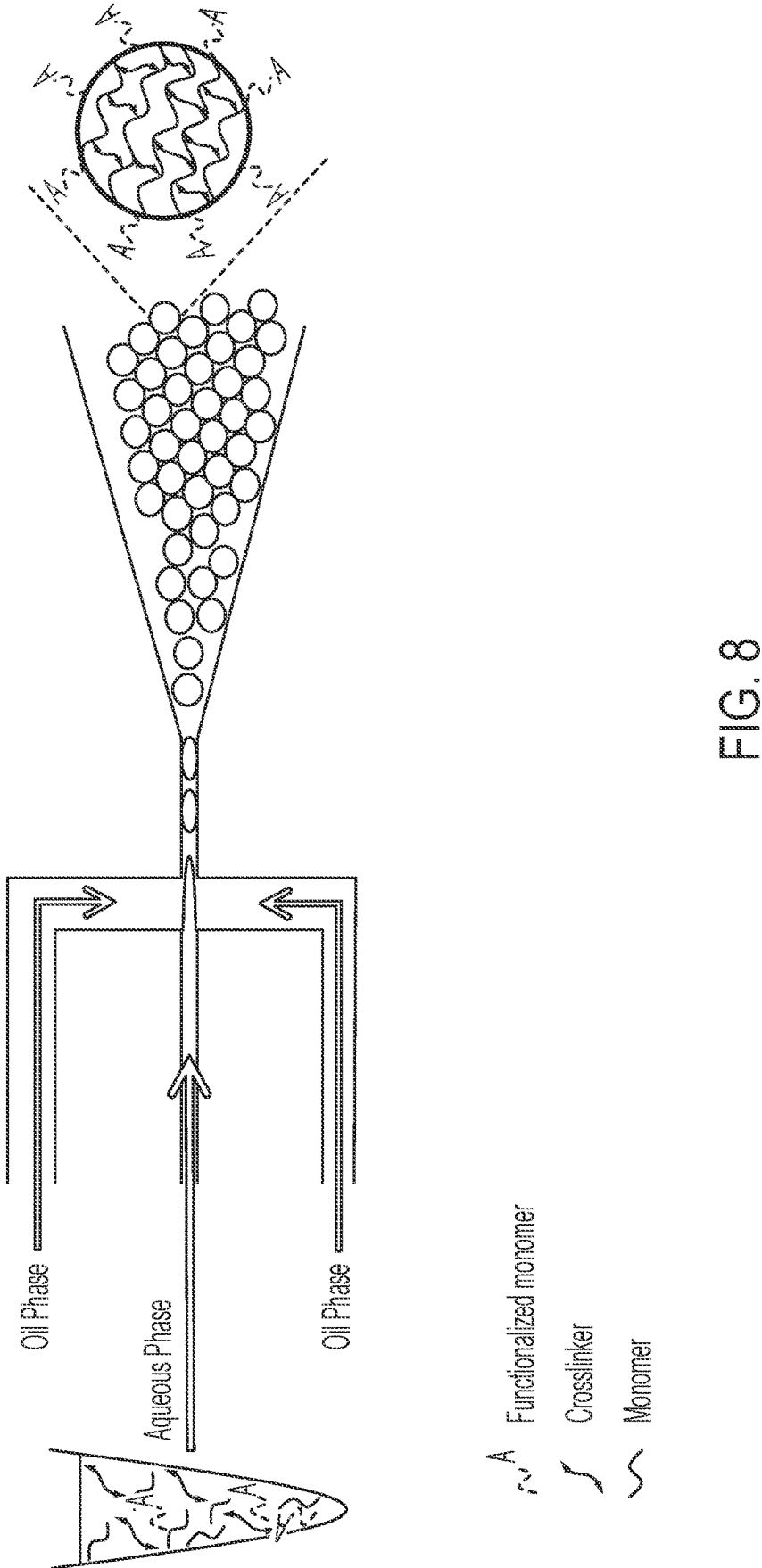
FIG. 8 illustrates an example of formation of gel materials using a multi-phase microfluidic device in accordance with aspects of the present disclosure.
Figure 9:
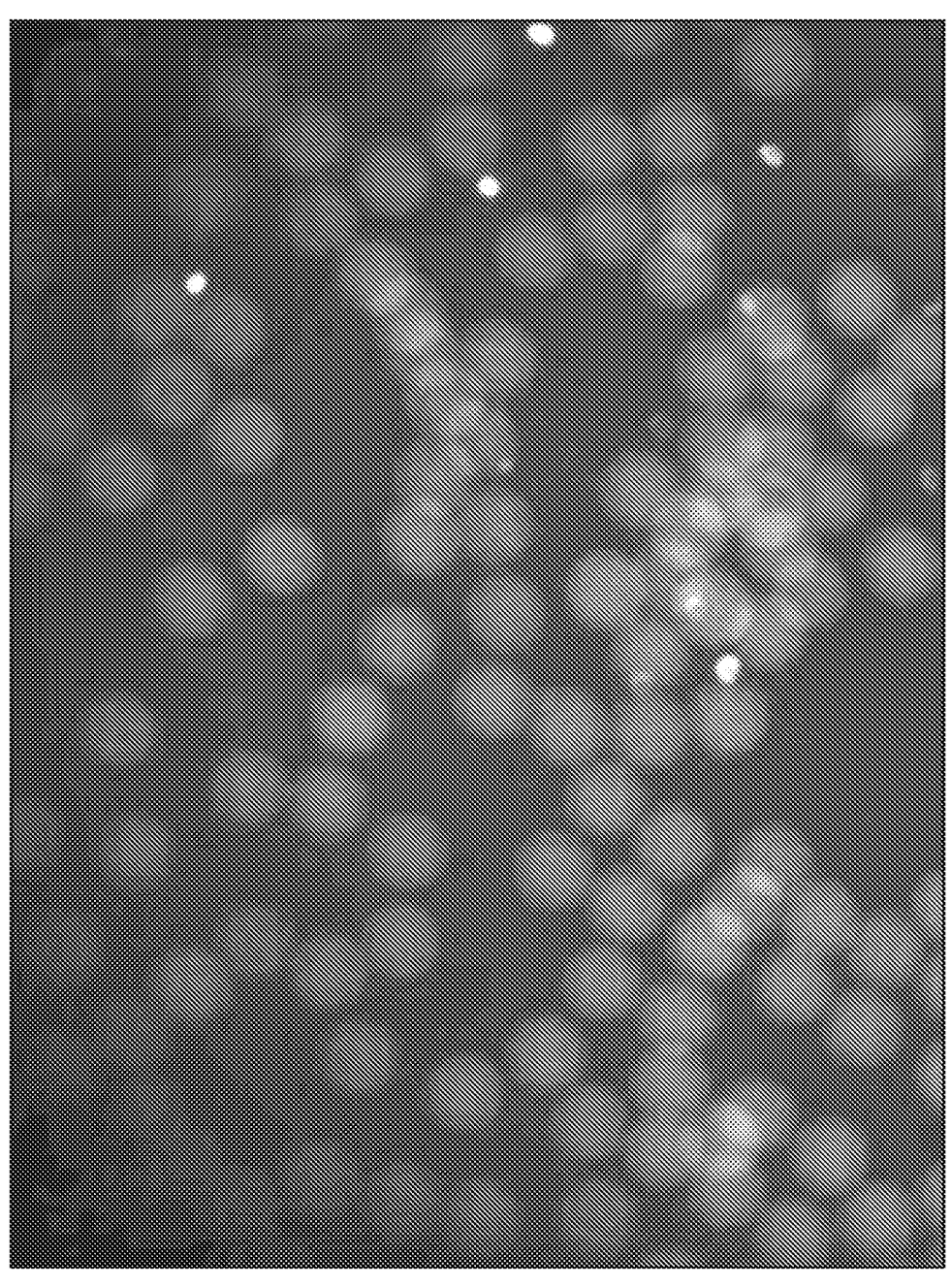
FIG. 9 illustrates an example of fluorescent beads resulting from attaching an azide-fluorescein molecule to a DBCO-functionalized material in accordance with aspects of the present disclosure.

DBCO-functionalized gel beads that can be functional- ized by azide labelled nucleic acids after polymerization were formed. The DBCO group used was PEG2-ARDB-1k, which is a poly(ethylene glycol) bi-functionalized polymer, with an acrylate as one functionality and DBCO as another functionality. The first step was preparing Solution A, which was an acrylamide/bis-acrylamide solution. Such a solution was prepared by mixing 3.6 mL solution of 40% acrylamide/ bis-acrylamide (19:1) with a solution of 2.58 mL of 40% acrylamide and 3.82 mL water. The second step was pre- paring Solution B by mixing 4 mg of PEG2-ARDB-1k with 1 mL of water. The third step was mixing 0.25 mL of Solution A with 0.2 mL of Solution B. The fourth step was adding 10% Ammonium persulfate aqueous solution to the mixture at a ratio of 7.5 to 250 respectively, just before the start of the polymerization reaction. The fifth step was to inject the resulting mixture through the aqueous channel of a microfluidic chip (FIG. 8) and exposing it to a solution of TEMED (tetramethylethylenediamine) dissolved in an oil phase at a concentration of 0.4%. Around 2 mL of the solution of TEMED in oil is needed for every 0.5 mL of the aqueous mixture. The generated emulsion is then allowed to sit at room temperature overnight to allow for the formation of gel beads.

Example 2

Azide Functionalized Gel Beads

Azide functionalized gel beads were formed. These gel beads were reacted with a hyperbranched PEG DBCO and then further functionalized by an azide labelled nucleic acid. To generate the gel beads two solutions were combined. Solution A was prepared by mixing 3.6 mL solution of 40% acrylamide/bis-acrylamide (19:1) with a solution of 2.58 mL of 40% acrylamide, 0.03 mL 10% ammonium persulfate and 3.82 mL water. Solution B was prepared by dissolving 14 mg of acrylamide PEG azide in 1 mL of water. The gel precursor solution was then formed by combining 0.6 mL of solution A with 0.4 mL of a 3.5 fold dilution of solution B. The mixture was injected into a microfluidic chip and partitioned into droplets using an oil carrier phase containing 0.004 mL TEMED per milliliter of oil. The creamed droplets were incubated overnight at room temperature to allow for polymerization. The emulsion was coalesced to release the gel beads, which were then washed into an aqueous buffer. To hyperbranch bead surfaces 0.0031 g of 8-ArmPEG- DBCO was reacted in the dark overnight at room tempera- ture with 0.1 mL of PEG-azide beads.

Example 3

Functionalized Gel Beads with Varying Degrees of Porosity

Functionalized gel beads with varying degrees of porosity were formed. To form these gel beads, Solution A was prepared by mixing 3.3 mL of a 40% acrylamide solution with 0.28 mL of a 40% w/v hexamethylenebis(methacryl- amide) solution. Solution A was then combined with 2.58 mL of 40% acrylamide and 3.82 mL of water to form Solution B. Prepolymer mix was then prepared by combin- ing Solution B with 0.03 mL of 10% ammonium persulfate.

Reverse emulsions of the mixture were formed using a flow focusing device and oil containing 0.004 mL TEMED. Polymerization was carried out at room temperature over- night.

Example 4

Fluorescent Gel Beads

Fluorescent gel beads were formed. DBCO-functional- ized beads were incubated with azide-functionalized fluo- rescent molecules. The resulting beads were imaged using a fluorescence microscope confirming the presence of DBCO functionalities on the surface of the beads and their avail- ability to react with azide functionalized molecules.

The presence of certain chemical functionalities available on the surface and/or pores of the functionalized beads were confirmed using DBCO-functionalized gel beads coupled with azide FAM isomer. 0.02 mL of gels/beads functional- ized with DBCO groups were mixed with 0.02 mL of 1 mg/mL azide FAM isomer and incubated overnight at room temperature. The resulting beads were examined under a fluorescent light and the images showed the presence of fluorescent beads, confirming the binding of azide FAM isomer to the functionalized beads, in turn confirming the presence of DBCO groups on the surface and/or pores of the functionalized beads.

Example 5

Gel Beads Functionalized with Photo-Cleavable Oligomers

Figure 10:
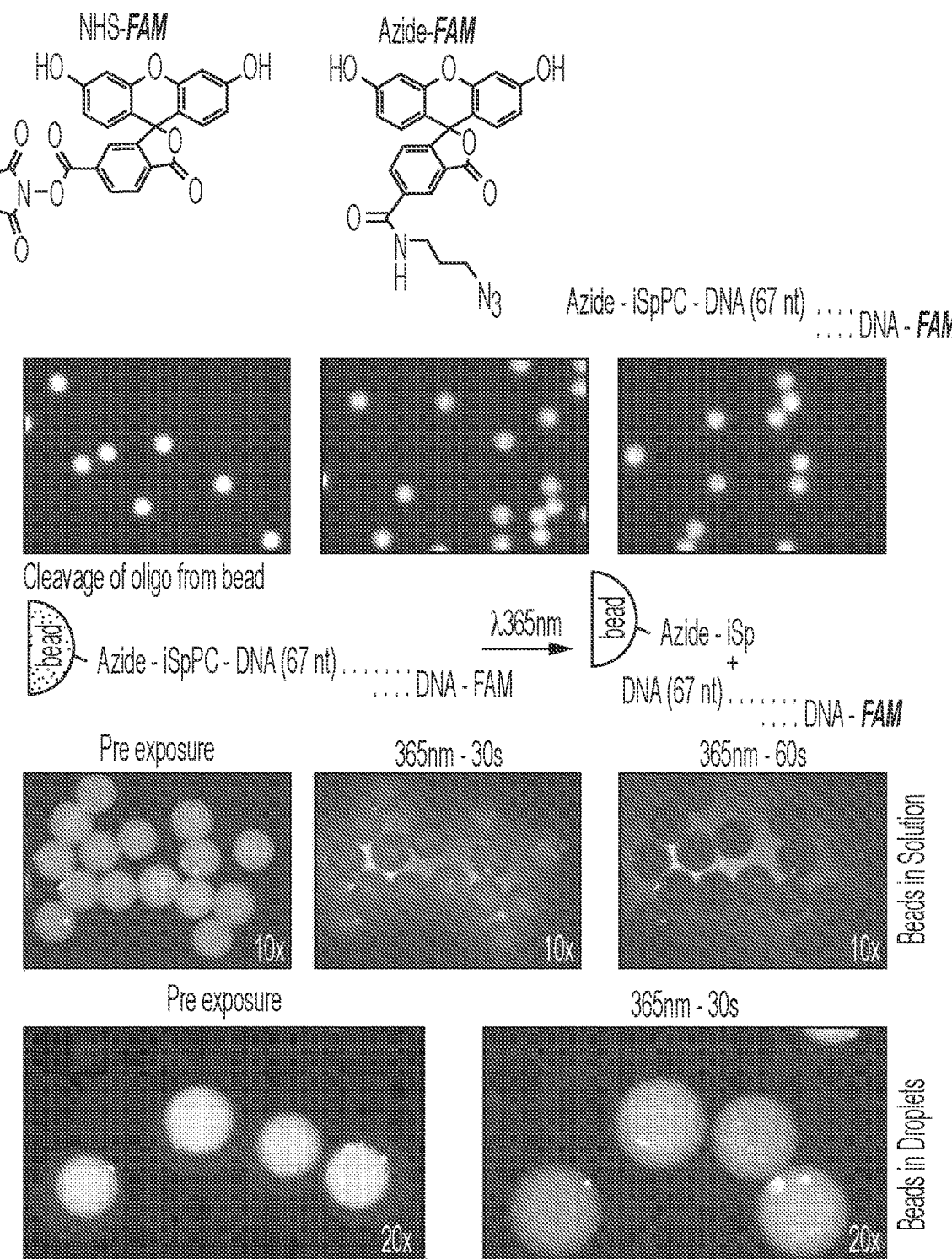
FIG. 10 illustrates an example of functionalizing beads after their polymerization, as well as the performance and application of such functionalized beads, according to some embodiments.

In order to confirm the presence and availability of chemical functionalities on the surface and/or pores of the functionalized beads and showcase the use of such beads, two types of beads were described in this Example 5 and illustrated in FIG. 10: On one hand, amine-functionalized beads were reacted with N-Hydroxysuccinimide (NHS)- functionalized photocleavable DNA oligomers. On the other hand, DBCO-functionalized beads were reacted with azide- functionalized photocleavable oligomers. Both types of beads were then paired up with the complimentary DNA- Fluorescein Amidite (FAM). In both cases, beads exhibited fluorescence, confirming the attachment of oligomers to the chemically functionalized beads. Furthermore, upon expo- sure of these beads to 365 nm ultraviolet light, oligomers were cleaved off the beads and released into their surround- ings, whether in bulk in solution or confined in small droplets.

Example 6

Gel Beads Functionalized with Microbe Receptors

Figure 11A:
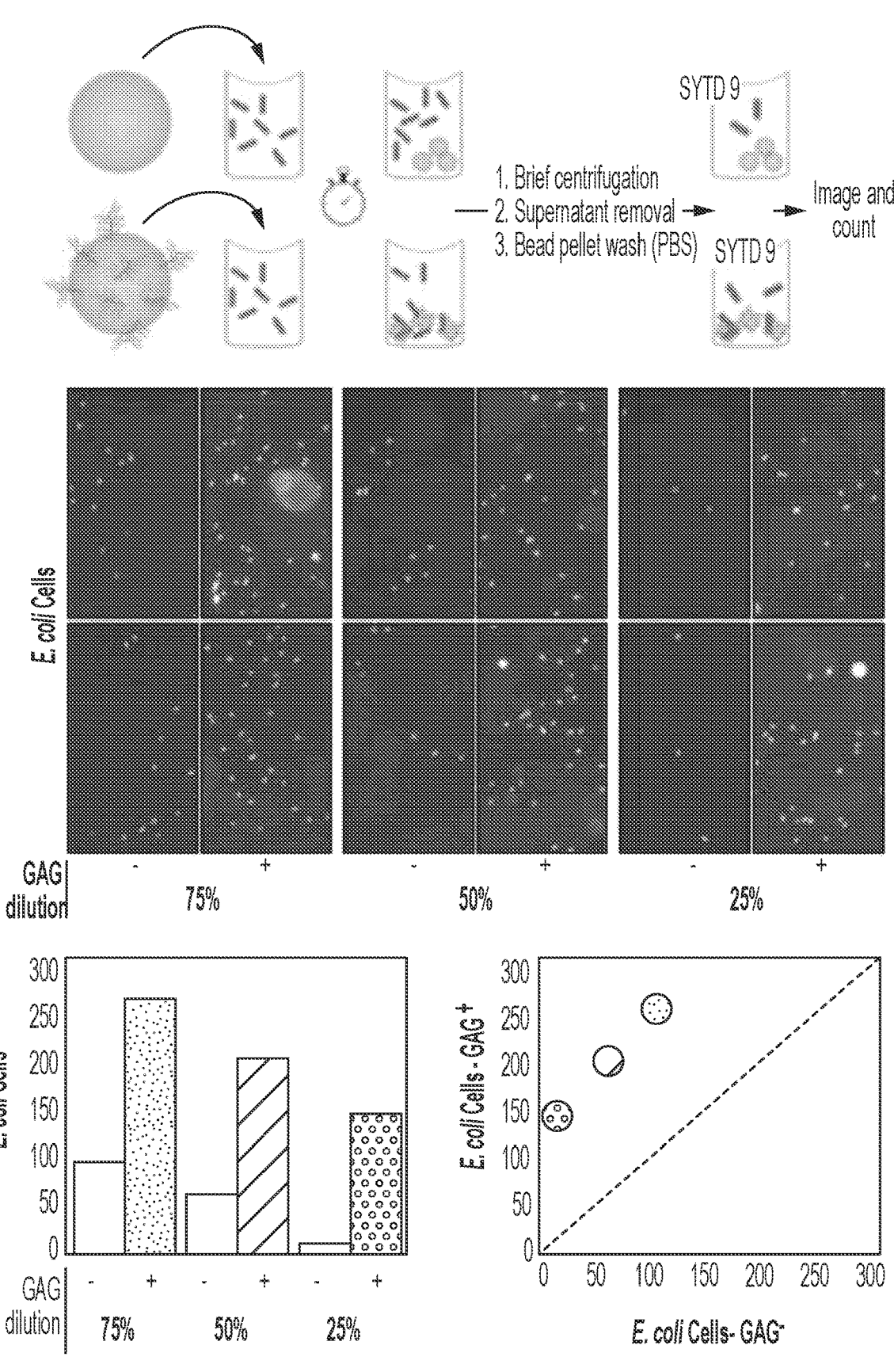
FIGS. 11A-11B illustrate an example activity of glycosaminoglycan functionalized beads in capturing a bacterium, according to some embodiments.
Figure 11B:
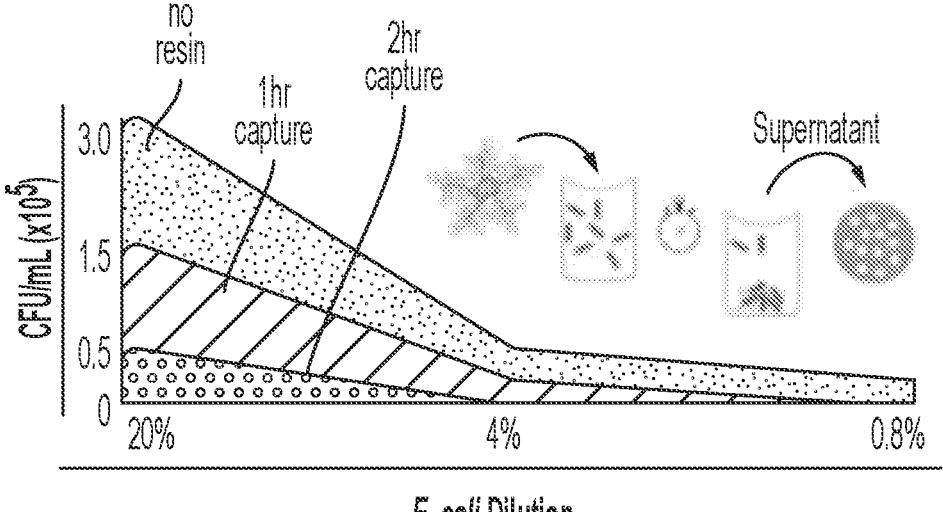

In order to confirm the presence and availability of chemical functionalities on the surface and/or pores of the functionalized beads and showcase the use of such beads, amine-functionalized beads were reacted with glycosamino- glycans (GAG) in the presence of carbonyldiimidazole. The GAG-functionalized beads are expected to bind microbes and separate them from solution via phase separation and/or gravity. Indeed, when mixed with *E. coli* infected samples as illustrated in FIG. 11A, the pelleted beads that are GAG- functionalized (GAG +) showed higher number of colony forming units compared to non-functionalized beads (GAG −). Furthermore, after separating the supernatants from the pelleted beads, a significant decrease in colony forming units in the supernatants was observed over a period of two hours, signaling to the capture of bacteria by the GAG-functionalized beads (FIG. 11B).

Example 7

Gel Beads Functionalized with 5' Phosphate Oligomers

Figures 12A, 12B:
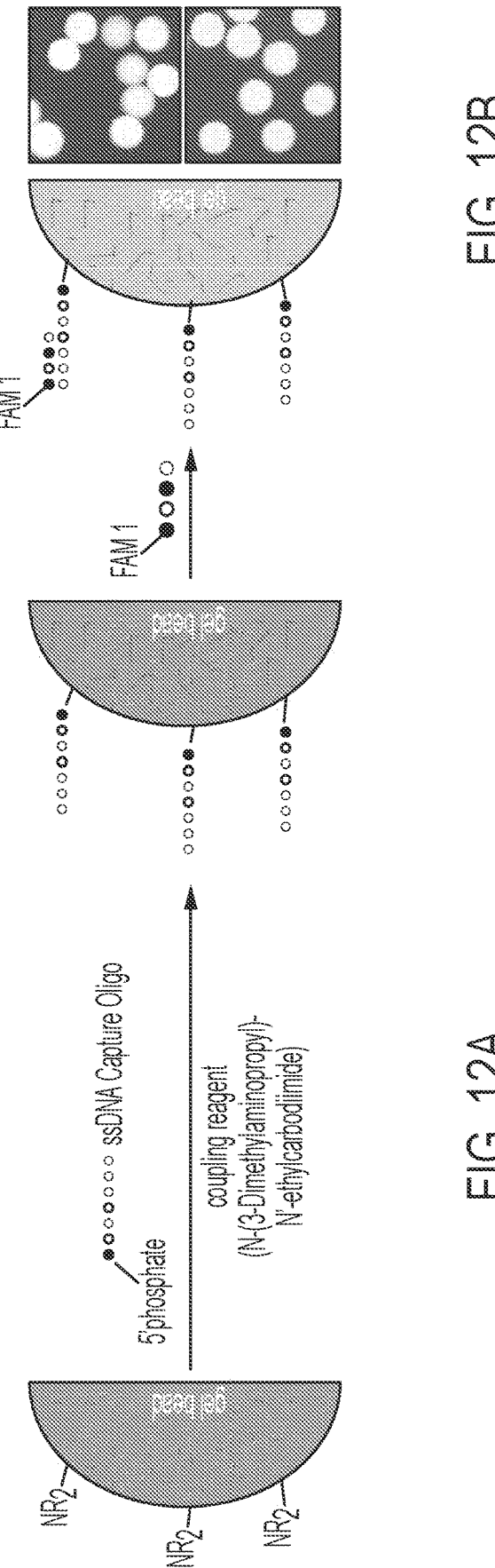
FIGS. 12A-12B illustrate an example of functionalizing universal beads with 5' phosphodate oligomer using common coupling reagent, according to some embodiments.

In order to confirm the presence and availability of chemical functionalities on the surface and/or pores of the functionalized beads and showcase the use of such beads, amine-functionalized beads were reacted with a single stranded DNA oligomer bearing a 5' phosphate group in the presence of a coupling reagent (e.g., carbodiimides such as N-(3-Dimethylaminopropyl)-N'-ethylcarbodiimide) (FIG. 12A). Oligomer functionalized beads can be used to capture nucleic acids from samples or single cells in order to separate them or to perform reactions such as PCR, RT and RT-PCR. After functionalization with capture oligomers, the hydrogel beads were probed using fluorescence in situ hybridization (FISH) and a small Fluorescein amidites (FAM) labelled single-stranded DNA (ssDNA) designed to anneal to part of the oligo attached to the bead (FIG. 12B). The beads were washed several times to eliminate any background fluorescence due to non-specific binding or oligomer trapping. High bead intensity was observed indicating that the capture oligomers were successfully and covalently linked to the universal beads.

Example 8

Bead in Gel and Trapping of Biologicals

Figure 13:
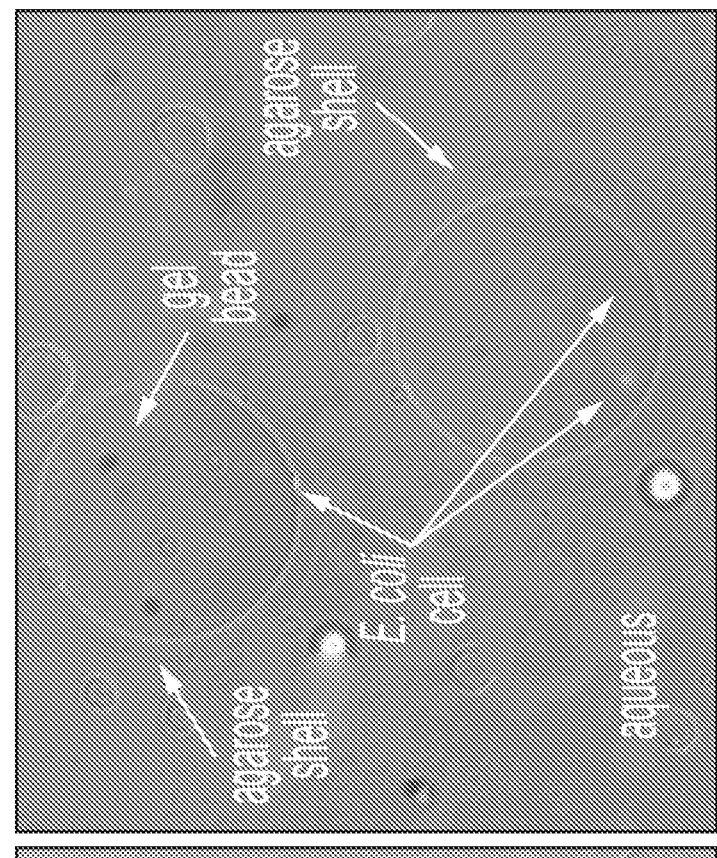
FIG. 13 illustrates an example of forming gel templated on bead and trapping *E. coli* within gel, according to some embodiments.
Figure 13:
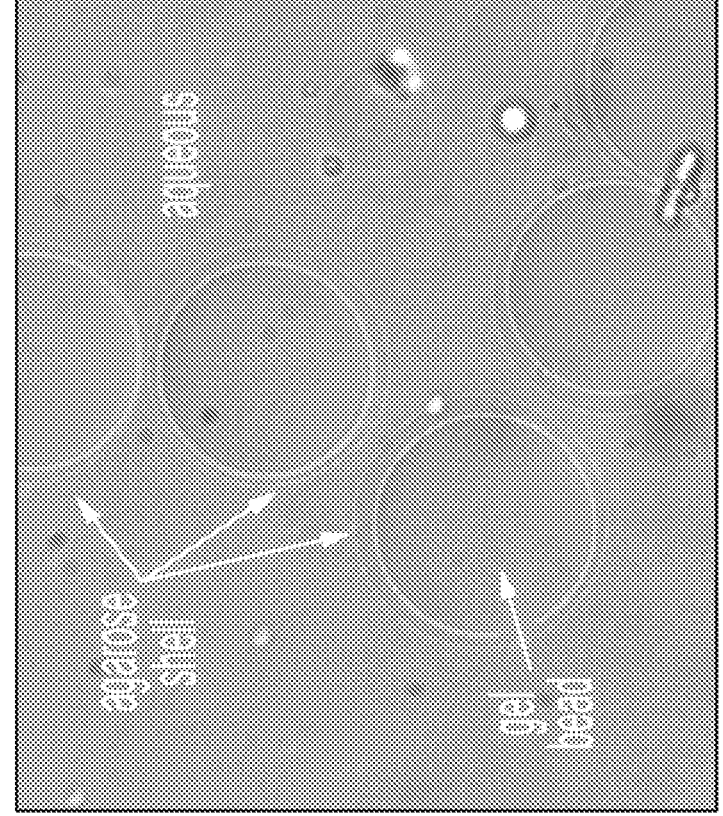

In order to demonstrate the production of bead in gel structures gel beads were used to template cooled but still molten agarose into droplets suspended in a fluorous phase. The droplets were cooled, broken and the fluorous phase was washed away. FIG. 13 shows the original gel beads surrounded by a newly formed agarose shell. The demonstration also shows the inclusion and trapping of biologicals (*E. coli* cells in this case) within the agarose shell.

What is claimed:

1. A method of making gel beads, the method comprising:
suspending a first fluid sample in a second fluid sample to form a plurality of fluidic droplets, wherein the first fluid sample comprises a plurality of first species; and
gelating the fluidic droplets to form a plurality of first gel beads comprising the first species, wherein one or more of the first species have one or more chemical functionalities,
suspending the first gel beads in a third fluid sample comprising a plurality of second species; and
reacting the one or more of the plurality of first species that have one or more chemical functionalities with one or more of the plurality of second species to functionalize the first gel beads with the one or more second species,
wherein the one or more chemical functionalities are non-biological functionalities.

2. The method of claim 1, wherein the one or more first species of the plurality of first species have one or more chemical functionalities that are not reactive with the other first species of the plurality of first species.

3. The method of claim 1, wherein the chemical functionality is amino, ammonium, hydroxyl, mercapto, sulfone, sulfinic acid, sulfonic acid, thiocyanate, thione, thial, thiol, carboxyl, halocarboxy, halogen, imido, anhydrido, alkenyl, strained alkene, strained cycloalkene, alkynyl, strained alkyne, strained cycloalkyne, phenyl, benzyl, carbonyl, formyl, haloformyl, carbonato, ester, alkoxy, phenoxy, hydroperoxy, peroxy, ether, glycidyl, epoxy, hemiacetal, hemiketal, acetal, ketal, orthoester, orthocarbonate ester, amido, imino, imido, azido, azo, cyano, nitrato, nitrilo, nitrito, nitro, nitroso, pyridinyl, phosphinyl, phosphonic acid, phosphate, phosphoester, phosphodiester, boronic acid, boronic ester, borinic acid, borinic ester, acrylate, methacrylate, alkylacrylate, alkyne, terminal alkyne, nitrone, biotin, streptavidin, dibenzocyclooctyl, cholesterol, trans-cyclooctene, tetrazine, any derivatives thereof, or any combinations thereof.

4. The method of claim 1, wherein at least one of the first species is magnetic, is colored and designed to color the first gel beads, and/or is a second gel bead.

5. The method of claim 1, wherein at least part of the gelation is reversible.

6. The method of claim 1, further comprising dissolving the first gel beads.

7. The method of claim 1, wherein the plurality of first species comprise one or more monomers comprising a first chemical functionality that can facilitate crosslinking of the one or more monomers, and/or
wherein the plurality of first species comprise at least one monomer comprising a second chemical functionality that does not facilitate crosslinking of the one or more monomers.

8. The method of claim 1, wherein the first chemical functionality comprises one or more of methacrylate, methacrylamide, acrylate, methacrylate, alkylacrylate, acrylamide, methacrylamide, alkylacrylamide, alkylmethacrylamide, strained alkene, strained cycloalkene, alkynyl, strained alkyne, strained cycloalkyne, epoxy, azido, dibenzocyclooctyl, or derivatives thereof.

9. The method of claim 7, wherein the second chemical functionality comprises one or more of amino, hydroxyl, mercapto, sulfone, thiol, halogen, strained alkene, strained cycloalkane, dibenzocyclooctyl, epoxy, hemiacetal, hemiketal, acetal, ketal, amido, imino, imido, carboxylic acid, acyl halide, or azido.

10. The method of claim 1, wherein the plurality of second species comprises at least one oligomer comprising a third chemical functionality that is configured to react with the second chemical functionality.

11. The method of claim 10, wherein the third chemical functionality comprises one or more of amino, hydroxyl, mercapto, sulfone, thiol, halogen, strained alkene, strained cycloalkane, dibenzocyclooctyl, epoxy, hemiacetal, hemiketal, acetal, ketal, amido, imino, imido, carboxylic acid, acyl halide, or azido.

12. The method of claim 10, wherein the at least one oligomer comprises nucleotides, locked nucleotides, proteins, peptides, or peptide nucleic acids.

13. The method of claim 1, wherein the gel beads are surface-functionalized with a second chemical functionality.

14. The method of claim 1, wherein the gel beads comprise polyacrylamide.

15. The method of claim 1, wherein the gel beads are surface-functionalized with an amino group.

16. The method of claim 1, wherein the surface of the gel beads comprises oligomers functionalized thereto, wherein the bulk of the gel beads comprises oligomers functionalized thereto, and wherein a total number of oligomers functionalized on the surface of the gel beads is at least 90% higher than a total number of oligomers functionalized to the bulk of the gel beads.

\* \* \* \* \*